US012409926B2

(12) United States Patent
Bernard

(10) Patent No.: US 12,409,926 B2
(45) Date of Patent: Sep. 9, 2025

(54) SYSTEMS AND METHODS FOR CONTROLLING TILTING OF TILTABLE COMPONENTS OF EVTOL AIRCRAFT

(71) Applicant: Archer Aviation, Inc., San Jose, CA (US)

(72) Inventor: Guy Bernard, Kirkland (CA)

(73) Assignee: Archer Aviation Inc., San Jose, CA (US)

( * ) Notice: Subject to any disclaimer, the term of this patent is extended or adjusted under 35 U.S.C. 154(b) by 117 days.

(21) Appl. No.: 18/189,597

(22) Filed: Mar. 24, 2023

(65) Prior Publication Data
US 2024/0117829 A1    Apr. 11, 2024

Related U.S. Application Data

(60) Provisional application No. 63/378,680, filed on Oct. 7, 2022, provisional application No. 63/378,536, filed on Oct. 6, 2022.

(51) Int. Cl.
*B64C 29/00* (2006.01)
*B60L 15/06* (2006.01)
(Continued)

(52) U.S. Cl.
CPC .............. *B64C 11/02* (2013.01); *B60L 15/06* (2013.01); *B60L 15/38* (2013.01); *B64C 27/54* (2013.01); *B64C 29/0008* (2013.01); *B64C 29/0033* (2013.01); *B64D 27/30* (2024.01); *B64D 27/31* (2024.01); *B64D 27/34* (2024.01); *B64D 27/359* (2024.01); *B64D 31/18* (2024.01); *B64D 33/08* (2013.01); *B64D 35/021* (2024.01);
(Continued)

(58) Field of Classification Search
CPC ............ B64C 29/0091; B64C 29/0075; B64C 29/0033; B64C 27/006; B64C 27/28; B64C 27/52; F16H 31/005
See application file for complete search history.

(56) References Cited

U.S. PATENT DOCUMENTS 2,471,681 A    5/1949  Gluhareff
2,959,381 A *  11/1960  Hartel ................. B64C 25/20
                                                  244/102 R
(Continued)

FOREIGN PATENT DOCUMENTS

DE    102004017323 A1    11/2005

*Primary Examiner* — Joshua J Michener
*Assistant Examiner* — Colin Zohoori
(74) *Attorney, Agent, or Firm* — Finnegan, Henderson, Farabow, Garrett & Dunner LLP

(57) ABSTRACT

A joint assembly for an aircraft comprising: a joint comprising a first portion rotatably coupled to a second portion so that the first portion can rotate relative to the second portion; an actuator for rotating the first portion of the joint and comprising a connecting portion that connects to the first portion of the joint; and a latch moveable to a latched arrangement in which the latch prevents rotation of the first portion of the joint in at least one rotational direction, the latch being biased toward the latched arrangement and operatively connected to the connecting portion such that if the connecting portion becomes separated from the rest of the actuator, the latch moves to the latched arrangement, thereby preventing rotation of the first portion of the joint in the at least one rotational direction.

35 Claims, 22 Drawing Sheets

(51) Int. Cl.

| | |
|---|---|
| *B60L 15/38* | (2006.01) |
| *B64C 11/02* | (2006.01) |
| *B64C 27/54* | (2006.01) |
| *B64D 27/30* | (2024.01) |
| *B64D 27/31* | (2024.01) |
| *B64D 27/34* | (2024.01) |
| *B64D 27/359* | (2024.01) |
| *B64D 31/18* | (2024.01) |
| *B64D 33/08* | (2006.01) |
| *B64D 35/021* | (2024.01) |
| *B64D 35/026* | (2024.01) |
| *F16B 2/06* | (2006.01) |
| *F16H 57/08* | (2006.01) |
| *H02K 1/27* | (2022.01) |
| *H02K 1/32* | (2006.01) |
| *H02K 5/124* | (2006.01) |
| *H02K 5/20* | (2006.01) |
| *H02K 7/08* | (2006.01) |
| *H02K 7/116* | (2006.01) |
| *H02K 9/19* | (2006.01) |
| *H02K 11/33* | (2016.01) |
| *H02K 15/03* | (2006.01) |
| *H02M 7/5395* | (2006.01) |
| *H02P 21/00* | (2016.01) |
| *H02P 25/16* | (2006.01) |
| *H02P 27/06* | (2006.01) |
| *H02P 27/08* | (2006.01) |
| *H02K 7/00* | (2006.01) |

(52) U.S. Cl.
CPC .............. *B64D 35/026* (2024.01); *F16B 2/06* (2013.01); *F16H 57/08* (2013.01); *H02K 1/27* (2013.01); *H02K 1/32* (2013.01); *H02K 5/124* (2013.01); *H02K 5/203* (2021.01); *H02K 7/08* (2013.01); *H02K 7/116* (2013.01); *H02K 9/19* (2013.01); *H02K 11/33* (2016.01); *H02K 15/03* (2013.01); *H02M 7/5395* (2013.01); *H02P 21/50* (2016.02); *H02P 25/16* (2013.01); *H02P 27/06* (2013.01); *H02P 27/08* (2013.01); *B60L 2200/10* (2013.01); *B60L 2210/40* (2013.01); *H02K 7/006* (2013.01)

(56) References Cited

U.S. PATENT DOCUMENTS

| | | | |
|---|---|---|---|
| 3,533,713 A | | 10/1970 | Salmun |
| 3,560,720 A | * | 2/1971 | Degryse .................. G06M 3/14 |
| | | | 340/319 |
| 4,059,247 A | | 11/1977 | Prewitt |
| 5,765,773 A | | 6/1998 | Hanna et al. |
| 6,152,043 A | * | 11/2000 | Haring ............... B64D 11/0007 |
| | | | 104/140 |
| 7,261,517 B2 | | 8/2007 | Uphues et al. |
| 8,376,264 B1 | | 2/2013 | Hong et al. |
| 8,784,055 B2 | | 7/2014 | Perkinson |
| 9,701,406 B2 | | 7/2017 | Robertson et al. |
| 10,428,794 B2 | | 10/2019 | Ebbesen et al. |
| 10,767,499 B2 | | 9/2020 | Gianfranceschi |
| 2006/0067822 A1 | | 3/2006 | D'Anna |
| 2013/0214085 A1 | * | 8/2013 | Gaudette ................ F42B 10/16 |
| | | | 244/3.27 |
| 2013/0259688 A1 | | 10/2013 | Sorensen |
| 2022/0250737 A1 | | 8/2022 | Medina et al. |

\* cited by examiner

SYSTEMS AND METHODS FOR CONTROLLING TILTING OF TILTABLE COMPONENTS OF EVTOL AIRCRAFT

CROSS-REFERENCE TO RELATED APPLICATION

This application claims the benefit of U.S. Provisional Application No. 63/378,536, filed Oct. 6, 2022, and U.S. Provisional Application No. 63,378,680, filed Oct. 7, 2022, the entire contents of each of which are incorporated herein by reference.

FIELD

The present disclosure relates generally to aircraft, and more specifically, to aircraft with joint assemblies comprising fail-safe latches to prevent uncontrollable movement of various aircraft components.

BACKGROUND

Vertical take-off and landing (VTOL) aircraft are aircraft that can take-off and land vertically and hover. To take-off and land vertically and hover, VTOL aircraft can include one or more proprotors that can be tilted between a position for providing vertical thrust for take-off and landing and hover and a position for providing forward thrust for forward flight. VTOL aircraft can include wings like conventional fixed-wing aircraft that provide lift during forward flight. The wings can include control surfaces that can tilt to different positions for manipulating aerodynamic characteristics of the aircraft in flight. Since the proprotors and control surfaces control the performance of the aircraft in flight, they must be designed to avoid catastrophic failure. This can often include introducing redundant components such that if one component fails, another component takes over, and/or overdesigning components so that a particular failure mode is not catastrophic. However, redundant components and overdesigned components introduce additional undesirable weight that can increase the manufacturing cost and operational cost of the aircraft.

SUMMARY

Joint assemblies for actuated tiltable components of an aircraft, such as a tiltable proprotor and/or a tiltable control surface, are disclosed herein that include a fail-safe latch that automatically latches to prevent rotation of the joint in at least one direction in the event that an actuator driving the tiltable component becomes disconnected from the tiltable component. Actuator shafts used to drive the tiltable components described herein are a single point of failure that experience a high load. Actuator shafts can break under such high loads resulting in actuator disconnect from the tiltable components. This breakage results in a free-floating tiltable component (e.g., control surface or proprotor) and allows for uncontrolled tilting or flutter of the component and can ultimately lead to a catastrophic failure. Aircraft thus require design elements that mitigate risk of catastrophic failure in the event of such disconnect. The joint assemblies described herein are capable of preventing uncontrolled movement of the tiltable components in the case of actuator disconnection, thus providing alternatives to redundancy and overdesign.

According to an aspect, a joint assembly for a tiltable component of an aircraft includes a joint that includes a first portion rotatably coupled to a second portion such that the first portion can rotate relative to the second portion. The first portion of the joint can be rotated using an actuator connected to the first portion of the joint at a connecting portion of the actuator. The first portion of the joint can be configured to mount a tiltable component of the aircraft such that rotating, by the actuator, the first portion of the joint tilts or rotates the tiltable component of the aircraft. The joint assembly includes a fail-safe latch in order to prevent uncontrollable rotation of the tiltable component in the event of actuator disconnection from the joint assembly, for instance, due to a break in the actuator shaft. When latched, the latch prevents rotation of the first portion of the joint in at least one rotational direction. The latch may be biased toward a latched arrangement such that if the connecting portion of the actuator becomes separated from the rest of the actuator, the latch automatically moves to the latched arrangement, thereby preventing uncontrolled motion of the tiltable component.

According to an aspect, a joint assembly for an aircraft includes a joint comprising a first portion rotatably coupled to a second portion so that the first portion can rotate relative to the second portion; an actuator for rotating the first portion of the joint and comprising a connecting portion that connects to the first portion of the joint; and a latch moveable to a latched arrangement in which the latch prevents rotation of the first portion of the joint in at least one rotational direction, the latch being biased toward the latched arrangement and operatively connected to the connecting portion such that if the connecting portion becomes separated from the rest of the actuator, the latch moves to the latched arrangement, thereby preventing rotation of the first portion of the joint in the at least one rotational direction.

In some examples of the assembly, the latch comprises a first portion that is coupled to the connecting portion of the actuator and a second portion that is in fixed arrangement with the second portion of the joint, the first portion being spaced from the second portion when the latch is in an unlatched arrangement and engaged with the second portion when the latch is in the latched arrangement.

In some examples of the assembly, the first portion of the latch is integral to the connecting portion of the actuator.

In some examples of the assembly, the connecting portion of the actuator comprises an output shaft of the actuator and the first portion of the latch projects from the output shaft.

In some examples of the assembly, the connecting portion of the actuator comprises an output shaft that has a rotational axis that extends in a direction of bias of the first portion of the latch toward the second portion of the latch.

In some examples of the assembly, the second portion of the latch is formed in the second portion of the joint.

In some examples of the assembly, the latch comprises a ratchet that when in the latched arrangement prevents rotation of the first portion of the joint in a first rotational direction and permits rotation of the first portion of the joint in a second rotational direction.

In some examples of the assembly, the first portion of the joint is configured for mounting a proprotor and, when the proprotor is mounted to the first portion of the joint, the proprotor is tiltable in the first rotational direction from a vertical thrust position to a forward thrust position.

In some examples of the assembly, the latch is configured to prevent rotation of the first portion of the joint in both rotational directions when in the latched arrangement.

In some examples of the assembly, the latch comprises a pawl that is rotatably mounted to the first portion of the joint.

In some examples of the assembly, the pawl is connected to the connecting portion such that movement of the connecting portion causes rotation of the pawl relative to the first portion of the joint.

In some examples, the assembly includes a bracket that mounts to the connecting portion of the actuator and at least one link that connects the pawl to the bracket.

In some examples of the assembly, a spring is connected to the bracket and biases the bracket, thereby biasing the pawl toward the latched arrangement.

In some examples of the assembly, the connecting portion of the actuator is rotatably connected to the first portion of the joint.

In some examples of the assembly, the first portion of the joint is configured to mount a control surface of the aircraft.

In some examples of the assembly, the connecting portion of the actuator is splined to the first portion of the joint and is held in tension such that if the connecting portion becomes separated from the rest of the actuator, the connecting portion moves away from the rest of the actuator while remaining splined to the first portion of the joint.

In some examples, an aircraft includes the joint assembly of any of the examples described herein.

In some examples, the aircraft includes a proprotor coupled to the first portion of the joint, wherein the actuator tilts the proprotor between a vertical thrust orientation and a forward flight orientation.

In some examples, the aircraft includes a control surface mounted to the first portion of the joint.

An exemplary method of operating an aircraft includes: adjusting a rotational position of a proprotor or control surface of the aircraft that is mounted to the aircraft at a joint by rotating a first portion of the joint relative to a second portion of the joint by an actuator, wherein the joint comprises a fail-safe latch that automatically latches to prevent rotation of the first portion of the joint relative to the second portion of the joint in at least one direction if the actuator becomes disconnected from the first portion of the joint.

In some examples of the method, the fail-safe latch prevents rotation of the first portion of the joint relative to the second portion of the joint in both directions when latched.

In some examples of the method, the latch, when latched, prevents rotation of the first portion of the joint relative to the second portion of the joint in a first direction and permits rotation of the first portion of the joint relative to the second portion of the joint in a second direction.

In some examples of the method, the proprotor is tiltable in the first direction from a vertical thrust orientation to a forward thrust orientation.

It will be appreciated that any of the variations, aspects, features, and options described in view of the systems apply equally to the methods and vice versa. It will also be clear that any one or more of the above variations, aspects, features, and options can be combined.

BRIEF DESCRIPTION OF THE DRAWINGS

The invention will now be described, by way of example only, with reference to the accompanying drawings, in which.

DETAILED DESCRIPTION

Figure 1:
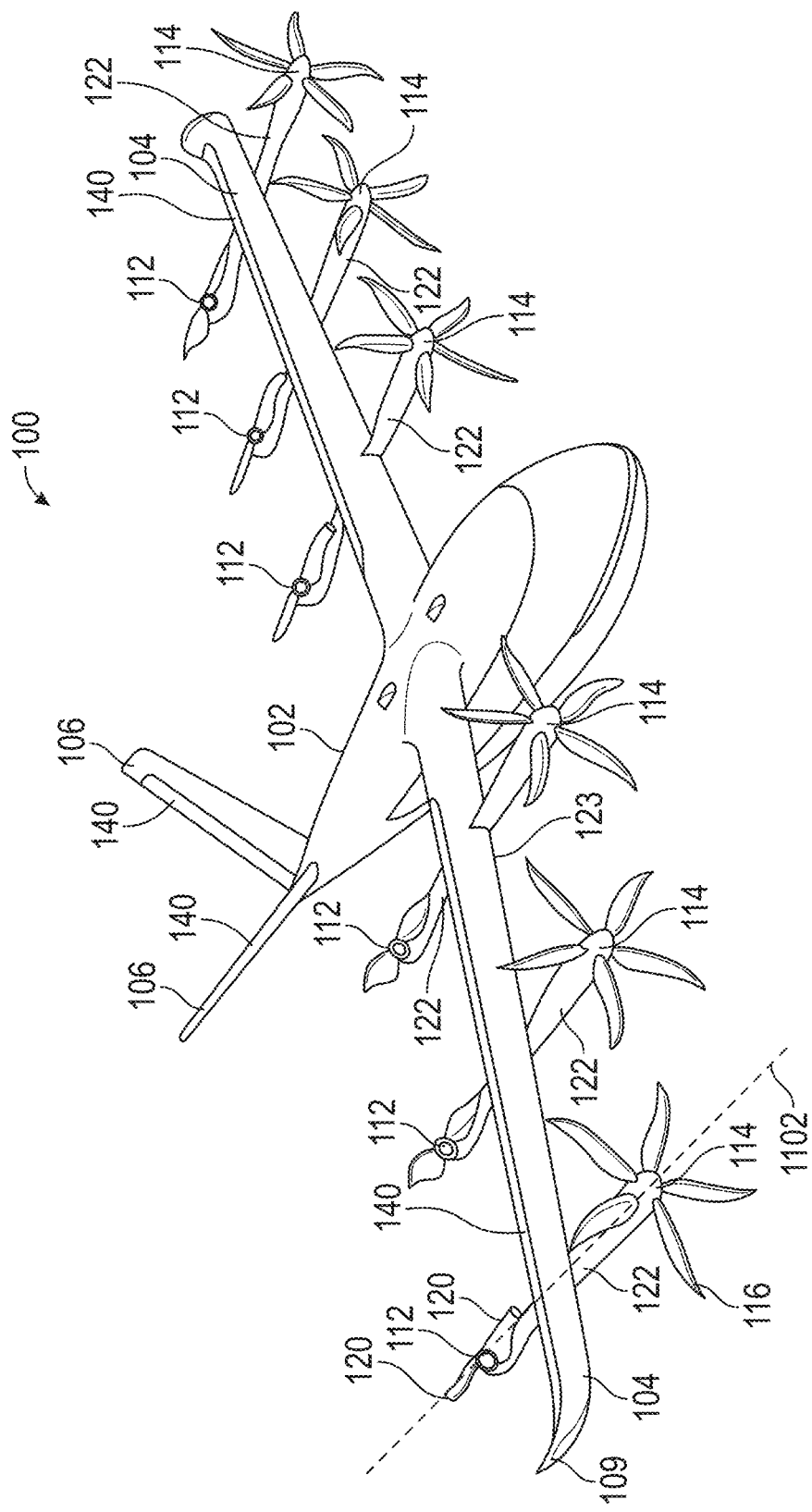
FIG. 1 shows an aircraft in a forward flight configuration, according to one or more examples of the disclosure.

In the following description of the various examples, reference is made to the accompanying drawings, in which are shown, by way of illustration, specific examples that can be practiced. The description is presented to enable one of ordinary skill in the art to make and use the invention and is provided in the context of a patent application and its requirements. Various modifications to the described examples will be readily apparent to those persons skilled in the art and the generic principles herein may be applied to other examples. Thus, the present invention is not intended to be limited to the examples shown but is to be accorded the widest scope consistent with the principles and features described herein.

Described herein are systems, devices, and methods for preventing uncontrolled movement of aircraft tiltable components using a joint assembly that includes a fail-safe latch. As described above, uncontrolled movement of tiltable components, such as tiltable proprotors and tiltable control surfaces, in the event of actuator disconnection (e.g., disconnection of a connection portion of the actuator from the rest of the actuator by a break in the actuator shaft) poses a risk of catastrophic failure. To mitigate such risk, aircraft may be designed with redundant components, such as redundant actuators, and/or with overdesigned components that can withstand the uncontrolled motion, both of which add weight and cost to the aircraft design and increase operational cost. A joint assembly, according to the principles described herein, can eliminate the need for redundant components and/or overdesign of components to mitigate uncontrolled movement of tiltable components by automatically latching to prevent rotational movement of the tiltable component in the event an actuator that controls the tilting of the tiltable component becomes disconnected from the tiltable component. By preventing uncontrolled movement of the tiltable component in the event the actuator becomes disconnected, other catastrophic failure mitigation solutions, such as overdesign of the joint and surrounding components to withstand uncontrolled motion and/or redundant actuators that can take over for a failed component, can be avoided. Thus, the systems, devices, and methods described herein provide for a more cost efficient aircraft design and reduced weight of the overall aircraft while meeting requirements for safety.

Joint assemblies, according to various examples, include a joint that has a first portion rotatably coupled to a second portion such that the first portion can rotate relative to the second portion and an actuator for rotating the first portion of the joint, the actuator including a connecting portion that connects to the first portion of the joint. The joint assembly further includes a latch moveable to a latched arrangement in which the latch prevents rotation of the first portion of the joint in at least one direction. The latch is biased toward the latched arrangement and operatively connected to the connecting portion of the actuator such that if the connecting portion becomes separated from the rest of the actuator, the latch moves to the latched arrangement, thereby preventing rotation of the first portion of the joint in the at least one rotational direction. In some examples, the latch comprises a pawl and sector gear that are configured such that if the actuator becomes disconnected, the pawl is forced to engage with the sector gear, thereby preventing rotation in at least one direction. In some examples, the latch comprises a conical lock and locking cavity, such that if the actuator becomes disconnected, the conical lock is forced to engage with the locking cavity, for instance, in a friction-fit arrangement, thereby preventing rotation in the at least one direction.

In some examples, a joint assembly that includes a fail-safe latch can be configured for tiltably connecting a proprotor to a structure of the aircraft, such as a boom assembly. A first portion of the joint can mount the proprotor and can be rotatably connected to a second portion of the joint that is mounted to the support structure of the aircraft. An actuator for tilting the proprotor can be connected by a connecting portion of the actuator to the first portion of the joint to tilt the first portion relative to the second portion, thereby tilting the proprotor. The latch can include a first portion connected to the connecting portion of the actuator and a second portion in fixed arrangement with the second portion of the joint. The latch may be biased toward the latched arrangement, such that if the connecting portion of the actuator becomes separated from the rest of the actuator, the latch will move to the latched arrangement to prevent rotation of the first portion of the joint in at least one rotational direction.

In some examples, a joint assembly that includes a fail-safe latch can be configured for tiltably connecting a control surface to a support structure of the aircraft, such as a structural support of an aircraft wing. A first portion of the joint can mount the control surface and be rotatably connected to a second portion of the joint that is mounted to the support structure of the aircraft. An actuator for rotating the control surface can be connected by a connecting portion of the actuator to the first portion of the joint to rotate the first portion relative to the second portion, thereby rotating the control surface. As described above, the latch can include a first portion connected to the connecting portion of the actuator and a second portion in fixed arrangement with the second portion of the joint. The latch may be biased toward the latched arrangement, such that if the connecting portion of the actuator becomes separated from the rest of the actuator, the latch will move to the latched arrangement to prevent rotation of the first portion of the joint in at least one rotational direction.

As used herein, the singular forms "a," "an," and "the" used in the following description are intended to include the plural forms as well unless the context clearly indicates otherwise. It is to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

As used herein, the term "proprotor" refers to a variable tilt propeller in which the direction of thrust of the propeller can be changed by changing the tilt angle of the propeller. For example, the tilt angle can be changed from an angle that provides at least some degree of vertical thrust, such as for vertical take-off and landing, to an angle that provides at least some degree of horizontal thrust, such as for forward flight. As used herein, a proprotor lift configuration refers to any proprotor orientation in which the proprotor thrust is providing primarily lift to the aircraft and proprotor forward flight configuration refers to any proprotor orientation in which the proprotor thrust is providing primarily forward thrust to the aircraft.

As used herein, "vertical take-off and landing" ("VTOL") refers to the capability of an aircraft to move substantially vertically without lift being provided solely by wings of the aircraft. While this term encompasses directly vertical take-off and landing (i.e., vertical movement without any horizontal movement), it also encompasses vertical movement in combination with horizontal movement. It will be understood by a person having ordinary skill in the art that a VTOL aircraft may be capable of non-vertical take-off and landing. For example, a winged VTOL, such as various examples described herein, can take-off and land in a traditional airplane manner utilizing the lift provided by its wings at suitable airspeeds.

FIG. 1 shows an aircraft 100 in a forward flight configuration. The aircraft 100 includes a fuselage 102, wings 104 mounted to the fuselage 102, and one or more rear stabilizers 106 mounted to the rear of the fuselage 102. The wings 104 and/or rear stabilizers 106 may include one or more control surfaces 140. The aircraft 100 can be a vertical take-off and landing (VTOL) aircraft and may be a passenger aircraft. A plurality of rotors 112 are mounted to the wings 104 and are configured to provide lift, such as for take-off and landing. A plurality of proprotors 114 are mounted to the wings 104 and are tiltable between lift configurations in which they provide a portion of the lift required for vertical take-off and landing and hovering, and forward flight configurations (as shown in FIG. 1) in which they provide forward thrust to the aircraft 100 for horizontal flight.

During take-off and landing, the proprotors 114 are tilted to lift configurations in which their thrust is directed upward for providing lift. For forward flight, the proprotors 114 tilt from their lift configurations to their forward flight configurations in which their thrust is directed forward for providing forward propulsion. In other words, the pitch of the proprotors 114 is varied from a tilt angle in which the proprotor provides lift for take-off and landing (and, optionally, hover) to a tilt angle in which the proprotor provides forward thrust to the aircraft 100 for forward flight. The proprotors 114 can each be tilted by one or more actuators. The actuator(s) can be electrically powered. Optionally, each proprotor has a single actuator for adjusting its tilt. According to various embodiments, the aircraft 100 can include one or more damper mechanisms connected to each tiltable proprotor configured to limit a rate of change of the tilt angle of the tiltable proprotor, such as in the event that the actuator becomes disconnected or otherwise fails. Alternatively, or additionally, the aircraft 100 may include one or more joint assemblies that include a fail-safe latch, such as the latch 1516 described with reference to FIGS. 15-17 and/or the latch 1912 described with reference to FIGS. 21-22 below, configured to prevent tilting of the tiltable proprotor 114 or a control surface 140 of aircraft 100 by engaging the fail-safe latch (e.g., latch 1516 and/or 1912) in the event that the actuator becomes disconnected or otherwise fails.

When the aircraft 100 is in full forward flight, lift may be provided entirely by the wings 104, and the rotors 112 may be shut-off. The blades 120 of the rotors 112 may be locked in low drags positions for aircraft cruising. In some embodiments, the rotors 112 each have two blades 120 that are locked in minimum drag positions for cruising in which one blade is directly in front of the other blade as illustrated in FIG. 1. In some embodiments, the rotors 112 have more than two blades. In some embodiments, the proprotors 114 include more blades 116 than the rotors 112. For example, as illustrated in FIG. 1, the rotors 112 may each include two blades and the proprotors 114 may each include five blades. According to various embodiments, the proprotors 114 can have from 2 to 5 blades.

According to various embodiments, the aircraft includes only one wing 104 on each side of the fuselage 102 (or a single wing that extends across the entire aircraft) and at least a portion of the rotors 112 are located rearward of the wings 104 and at least a portion of the proprotors 114 are located forward of the wings 104. In some embodiments, all of the rotors 112 are located rearward of the wings 104 and all of the proprotors are located forward of the wings 104. According to some embodiments, all rotors 112 and proprotors 114 are mounted to the wings—i.e., no rotors or proprotors are mounted to the fuselage. According to various embodiments, the rotors 112 are all located rearwardly of the wings 104 and the proprotors 114 are all located forward of the wings 104. According to some embodiments, all rotors 112 and proprotors 114 are positioned inwardly of the wing tips 109.

According to various embodiments, the rotors 112 and proprotors 114 are mounted to the wings 104 by booms 122. The booms 122 may be mounted beneath the wings 104, on top of the wings, and/or may be integrated into the wing profile. According to various embodiments, one rotor 112 and one proprotor 114 are mounted to each boom 122. The rotor 112 may be mounted at a rear end of the boom 122 and a proprotor 114 may be mounted at a front end of the boom 122. In some embodiments, the rotor 112 is mounted in a fixed position on the boom 122. In some embodiments, the proprotor 114 is mounted to a front end of the boom 122 via a hinge or other system. The proprotor 114 may be mounted to the boom 122 such that the proprotor 114 is aligned with the body of the boom 122 when in its forward flight configuration, forming a continuous extension of the front end of the boom 122 that minimizes drag for forward flight.

The aircraft is operated during take-off and landing by positioning the proprotors in lift configurations and providing the required lift to the aircraft via the combined lift provided by the rotors and proprotors. According to various embodiments, during take-off and landing and/or hover, the proprotors can be maintained in predetermined lift configurations that can be the same across all proprotors or different for different proprotors. According to various embodiments, the tilt of at least some of the proprotors can be actively adjusted during take-off and landing and/or hover to provide the required stability and/or maneuvering. As discussed further below, the pitches of the blades of the proprotors (also referred to herein as the pitch angle and angle of attack) are mechanically linked to the tilt of the proprotors such that the blade pitch is coordinated with the proprotor tilt, such as to achieve maximum thrust when the proprotor is in the lift configuration and to achieve increased efficiency when the proprotor is in the forward flight configuration.

According to various embodiments, each rotor and/or each proprotor can be individually controlled by the flight controller according to the various operational degrees of freedom. According to various embodiments, the only degree of freedom of the rotor is the rotational speed of the rotor. According to various embodiments, the degrees of freedom of at least a portion of the proprotors includes the rotational speed of the proprotors, and the degree of tilt of the proprotors (combined with the blade pitch of the proprotors). According to various embodiments, any of these degrees of freedom can be actively controlled by the flight controller (either autonomously or in response to pilot commands) during take-off and landing in order to provide the appropriate stability and maneuvering.

Once the aircraft has achieved sufficient altitude to commence forward flight, the proprotors begin tilting forward toward their forward flight configurations such that their thrust provides a combination of lift and thrust, with a decreasing proportion of lift as the proprotors are tilted further toward their forward flight configurations. The pitch angle of the blades can be adjusted as the proprotors tilt forward toward their forward flight configurations. For instance, in the forward flight configuration, the blades of the proprotor can be at a pitch angle that results in less drag relative to a pitch angle of the blades when in the lift configuration. The rotors can remain active during at least a portion of the period in which the proprotors are tilted forward to continue to provide rotor-based lift. At any point after the forward airspeed is high enough that the wings provide sufficient lift to maintain the aircraft's altitude, the rotors can be deactivated.

The tilt of at least some of the proprotors can be actively controlled to provide additional stability and/or maneuverability control during cruising. In some embodiments, the tilt of at least some of the proprotors is actively controlled during take-off and landing and/or hover. In some embodiments, the tilt of the proprotors is fixed (i.e., non-varying) during cruise. According to some embodiments, the tilt of the outermost proprotors can be actively and independently controlled during vertical take-off and landing and/or hover to provide yawing moments as needed. The range of tilt angle of the tiltable proprotor(s) is at least 90 degrees, such that the proprotors can tilt between the forward flight configuration and the lift configuration.

Figure 2:
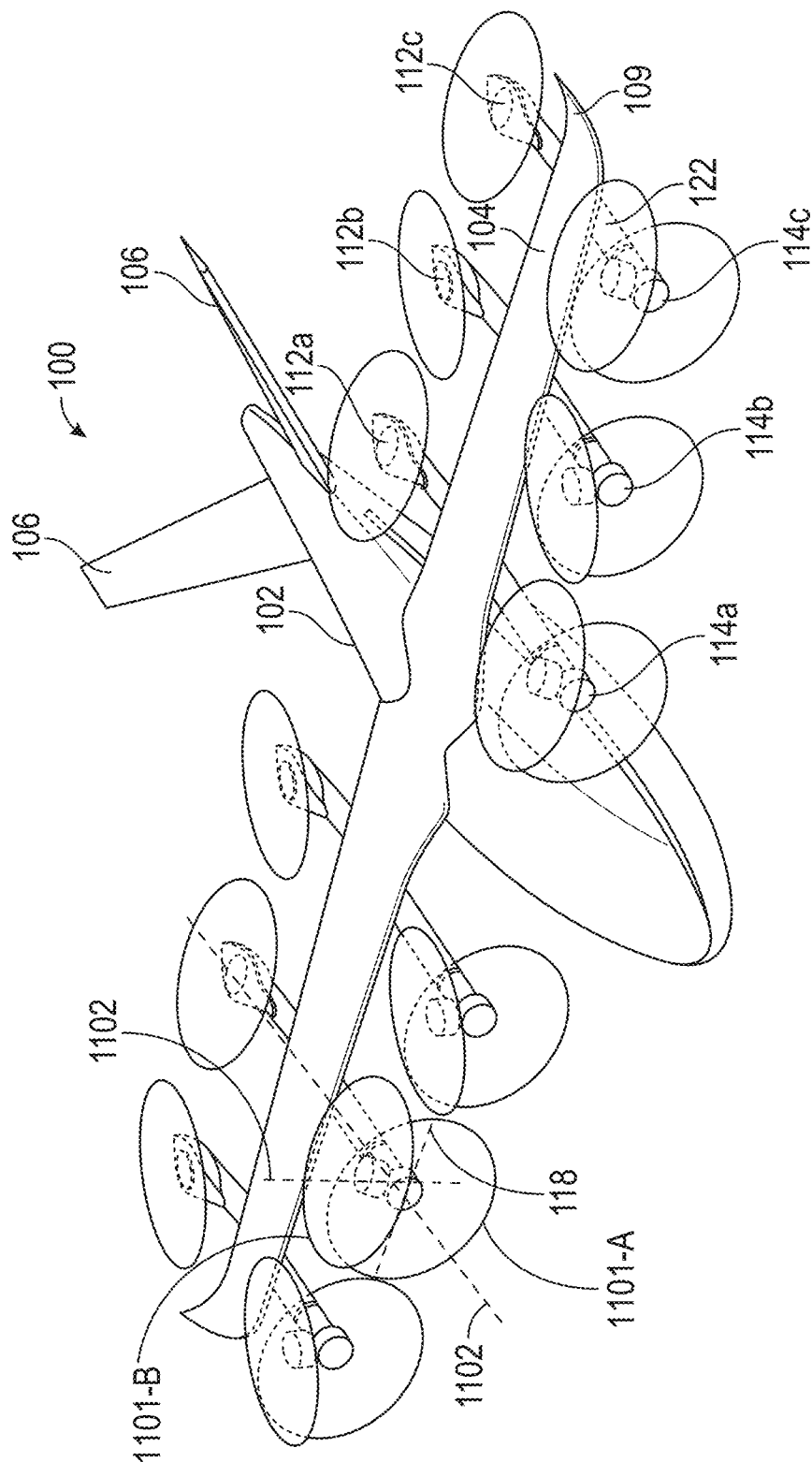
FIG. 2 is a perspective view of the aircraft of FIG. 1 illustrating the proprotor positions in the lift and forward flight configurations, according to one or more examples of the disclosure.

FIG. 2 is a perspective view of the aircraft 100 of FIG. 1 illustrating the proprotor positions in the lift and forward flight configurations, according to one or more examples of the disclosure. The proprotors 114 can tilt about the tilt axis 118 that is perpendicular to the forward direction of the aircraft. For forward flight, the proprotors tilt from the lift configuration, which provides vertical thrust, to a forward flight configuration, which provides forward thrust.

As described further below, the aircraft 100 can include a system to tilt the proprotors 114 between the lift configuration and the forward flight configuration. The system can mechanically link adjustment of the pitch angle of the blades of the proprotor 114 to the adjustment of the tilt of the proprotors 114.

Figure 3:
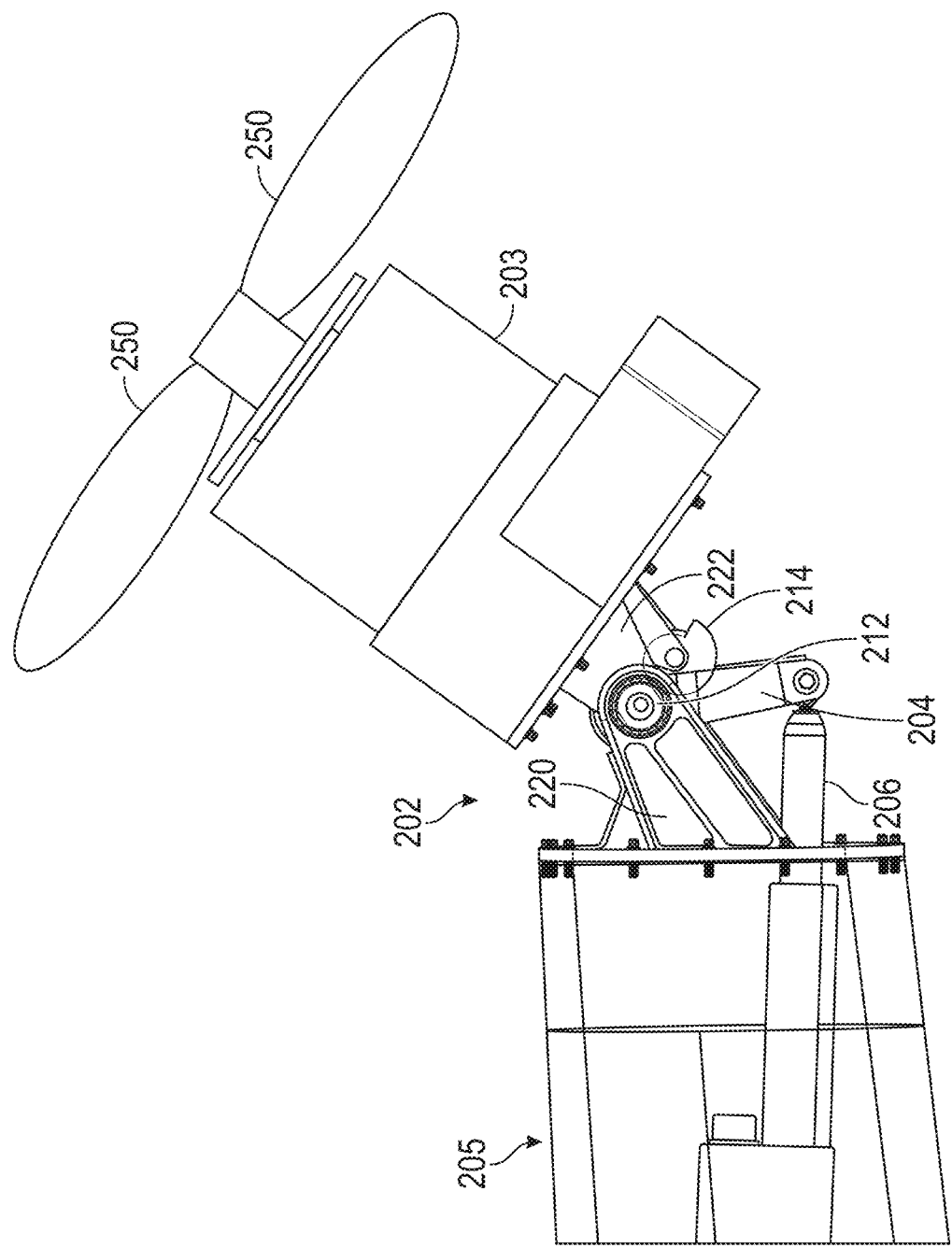
FIG. 3 shows a side view of a portion of an aircraft with an exemplary system, according to one or more examples of the disclosure.

FIG. 3 illustrates an exemplary system 202 for coupling tilting a proprotor with adjusting the pitch angle of blades of the proprotor. The system 202 is configured such that the pitch angle of the blades of the proprotor can correspond with the tilt position of the proprotor without requiring independent systems for tilting the proprotor and adjusting the pitch angle of the blades. Accordingly, the system 202 reduces the complexity and cost of the aircraft.

The system 202 rotatably couples a proprotor 203 to a boom 205 of an aircraft, proprotor 114 to boom 122 of aircraft 100. The system 202 can include a fixed frame 220 for mounting to the aircraft (e.g., the proprotor 203 can be connected to a boom 205 via a bracket 236 of the fixed frame 220) and a proprotor frame 222 to which the proprotor 203 mounts. The proprotor frame 222 can be tiltably connected to the fixed frame 220 at a joint 212.

The system 202 can include one or more arm(s) 204 connected to the proprotor frame 222. A linear actuator 206 can be connected to the arm(s) 204 tilt the proprotor 203 about the joint 212. The actuator 206 can be, for example, a ball screw actuator or a pneumatic actuator. Alternatively, rotary actuator, such as a stepper motor or a servomotor, can be mounted at the joint or can drive a gear train that has an output gear located at the joint or engaged with a gear located at the joint.

The system 202 can include a cam 214 that can rotate in correspondence with tilting of the proprotor 203. A control rod (discussed further below) can be operatively coupled with the cam 214 such that the control rod can translate when the cam 214 rotates. The control rod is coupled at its opposite end to the blades 250 of the proprotor 203 such that translation of the control rod adjusts the pitch angle of the blades 250 of the proprotor 203. Accordingly, the system 202 couples the pitch angle of the blades 250 of the proprotor 203 to the tilt of the proprotor 203. During operation, a control system of the aircraft can send a proprotor tilt adjustment command to the actuator 206. The actuator 206 may extend or retracted, causing the proprotor to increase or decrease its degree of tilt. As the proprotor tilt changes, the cam 214 rotates. This, in turn, can cause the control rod to translate, which adjusts the pitch of the blades 250.

Figure 4:
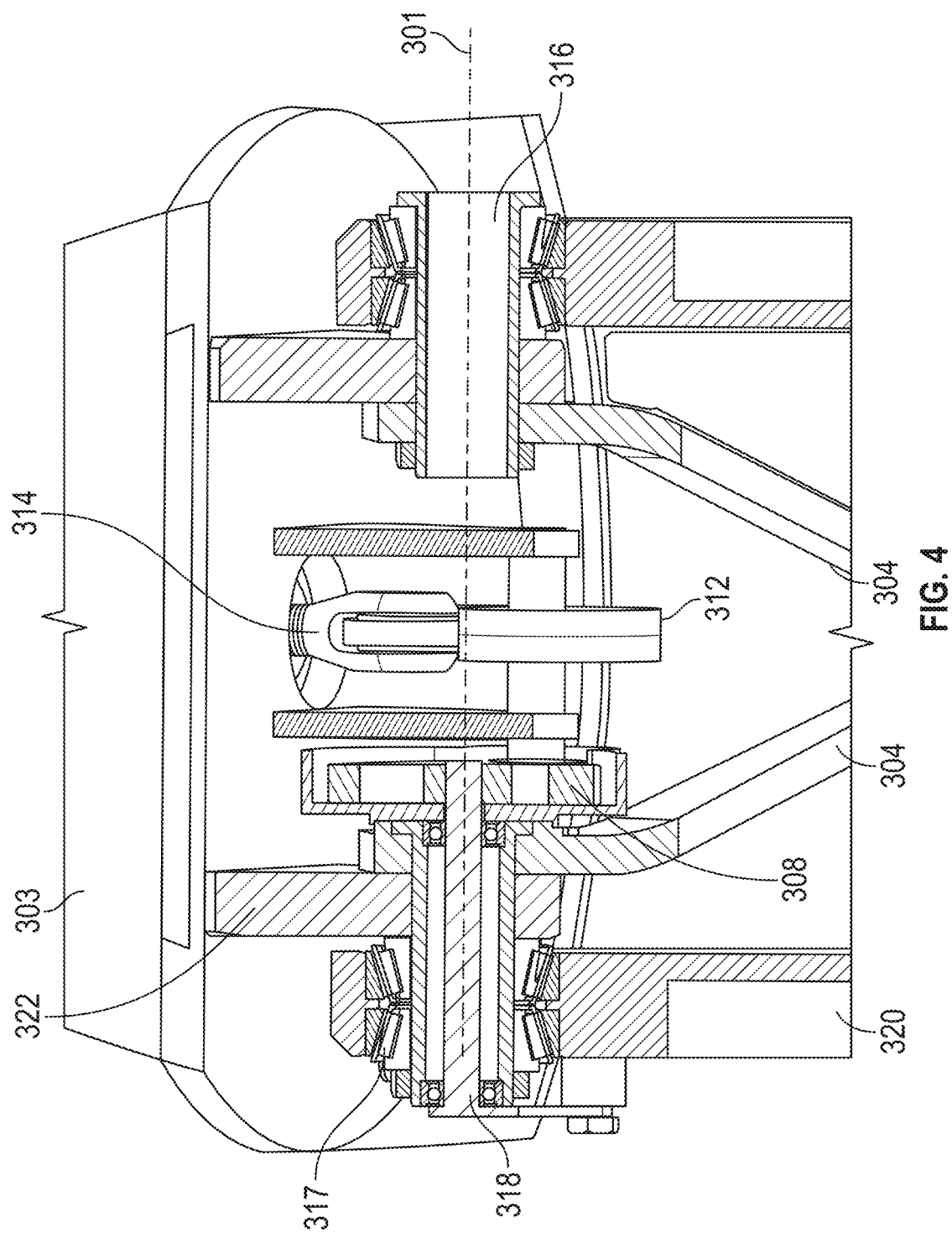
FIG. 4 shows a detail view of an exemplary system, according to one or more examples of the disclosure.

FIG. 4 shows a detail view of an exemplary system 302 for mechanically linking tilting a proprotor of an aircraft between a vertical thrust position and a forward thrust position with adjusting the pitch angle of blades of the proprotor. The system 302 can be used for system 202 of FIG. 3. The system 302 can include a fixed frame 320 for mounting to a portion of a VTOL aircraft (such as to the fuselage, wing, or a boom structure), and a proprotor frame 322 for mounting the proprotor 303 that is rotatably mounted to the fixed frame 320 at a rotation axis 301. In one or more examples, the system 302 includes a gear 308, a pinion (not shown in figure), a cam 312, a control rod 314, and a pair of arms 304.

As shown in FIG. 4, the gear 308 is located along the rotation axis 301. The gear 308 can be fixed in position relative to the fixed frame 320. For instance, as shown in FIG. 4, the gear 308 is connected to an internal pin 318 that attaches to the fixed frame 320. One or more of the shafts 316 can surround an internal pin 318, which is shown clearly by the cutaway view of the left shaft 316 of FIG. 4. A set of bearings 317 is located between each shaft 316 and the fixed frame 320 such that the shafts 316 are rotatably mounted to the fixed frame 320.

The proximal end of the arms 304 can engage with the proprotor frame 322. The engagement between the arms 304 and the proprotor frame 322 can be a fixed connection, such as by bolting or welding the arms 304 to the proprotor frame 322. Optionally, both the arms 304 and the proprotor frame 322 can be fixedly connected to the shafts 316. The distal end of the arms 304 can connect to one or more actuators 306 (see FIG. 5) that drive the arms 304 to rotate about the rotation axis 301. As the actuator 306 drives the arms 304, the proprotor 303 is rotated about the rotation axis 301.

Figure 5:
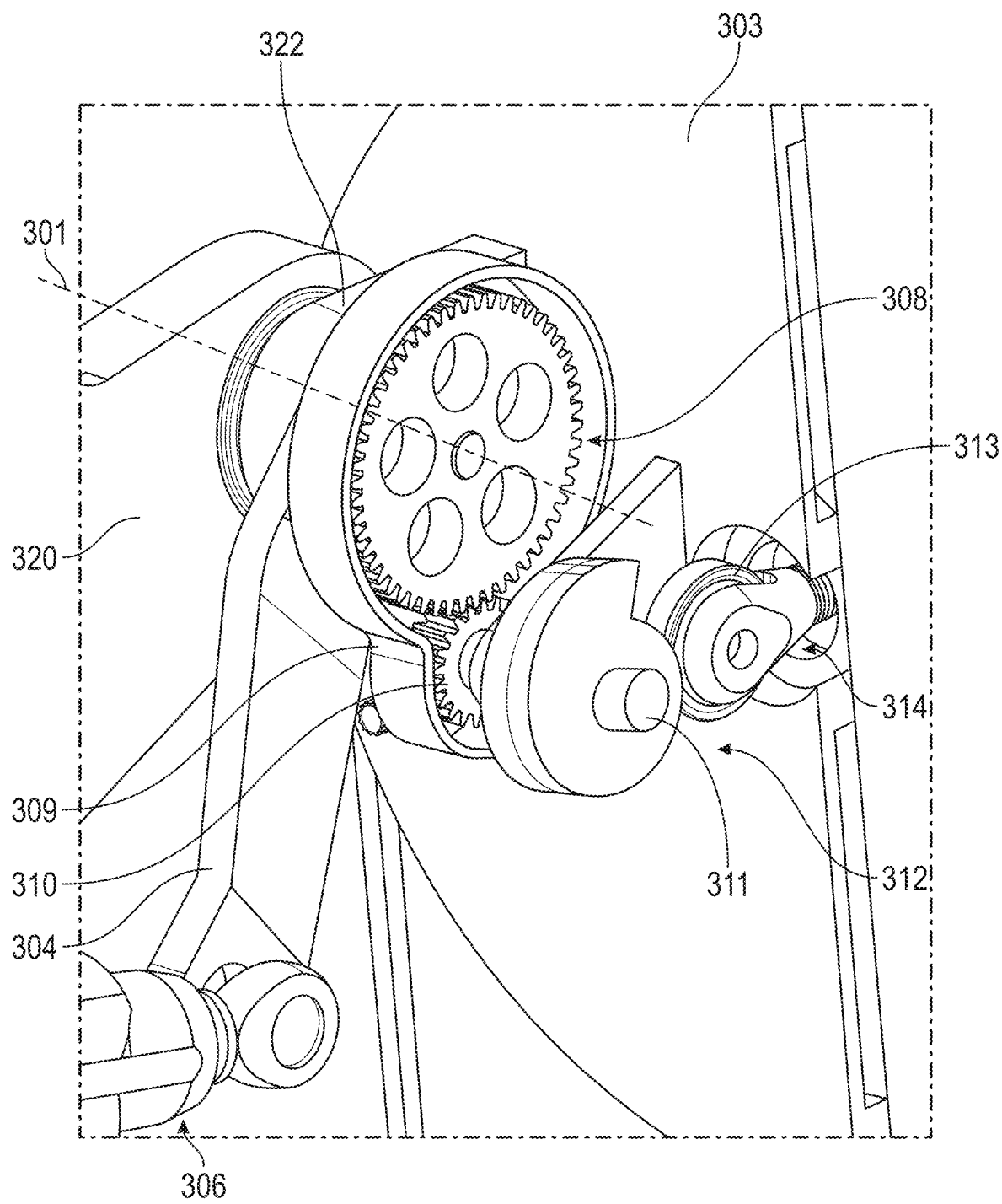
FIG. 5 shows a detail view of a portion of the exemplary system of FIG. 4, according to one or more examples of the disclosure.

The engagement between the gear 308, pinion, cam 312 and control rod 314 is shown more clearly in FIG. 5, which shows a detail view of a portion of the exemplary system 302 of FIG. 4. The pinion 310 is mounted within pinion housing 309, which is coupled in a fixed position to the arm 304 and/or the proprotor frame 322. Accordingly, the pinion 310 is rotationally coupled to the proprotor frame 322 such that the pinion 310 moves with the proprotor frame 322 (e.g., as the proprotor frame 322 and proprotor 303 rotate about the rotation axis 301). The pinion 310 is also engaged with the gear 308. Rotation of the pinion housing 309 drives the pinion 310 around at least a portion of the gear 308, which causes the pinion 310 to rotate via the toothed engagement with the gear 308.

The cam 312 is fixedly connected to the pinion 310, such as via the internal pin 311, such that the cam 312 rotates with the pinion 310. The cam 312 is also operatively coupled to a first end of the control rod 314, such that the control rod 314 translates relative to the internal pin 311 during at least a portion of the rotation of the cam 312. The control rod 314 is coupled at a second end to the blades of the proprotor (as will be described below) such that translation of the control rod 314 adjusts the pitch angle of the blades.

As the proprotor frame 322 rotates about the rotation axis 301 (e.g., to tilt the proprotor 303), the pinion 310 revolves around the gear 308, which rotates the cam 312 and translates the control rod 314, thereby adjusting the pitch angle of the blades of the proprotor 303. Accordingly, the system 302 mechanically links tilting the proprotor 303 with adjusting the pitch angle of the blades of the proprotor 303.

The control rod 314 can be engaged with the cam 312 via a follower that follows the cam 312 as the cam 312 rotates. The follower can be, for example, a roller or a pin. As shown in FIG. 5, the control rod 314 engages the cam 312 via a roller 313. The roller 313 travels along the outer surface of the cam 312 as the cam 312 rotates. To remain engaged with the outer surface of the cam 312, the control rod 314 can be biased in compression against the cam 312, such as via a spring (not shown in figure).

The cam profile (e.g., shape of its outer surface that the control rod follows) controls the position of the control rod. The profile of the cam 312 can include one or more portions that cause translation of the control rod 314 and can include one or more portions do not cause the control rod 314 to translate. For example, the cam 312 can have one or more spiral portions that cause translation of the control rod 314 and/or one or more circular portions that do not cause the control rod 314 to translate. In the example shown in FIG. 5, the cam 312 includes a spiral profile that will cause the control rod 314 to continuously translate throughout the range of tilt of the proprotor.

Figure 6:
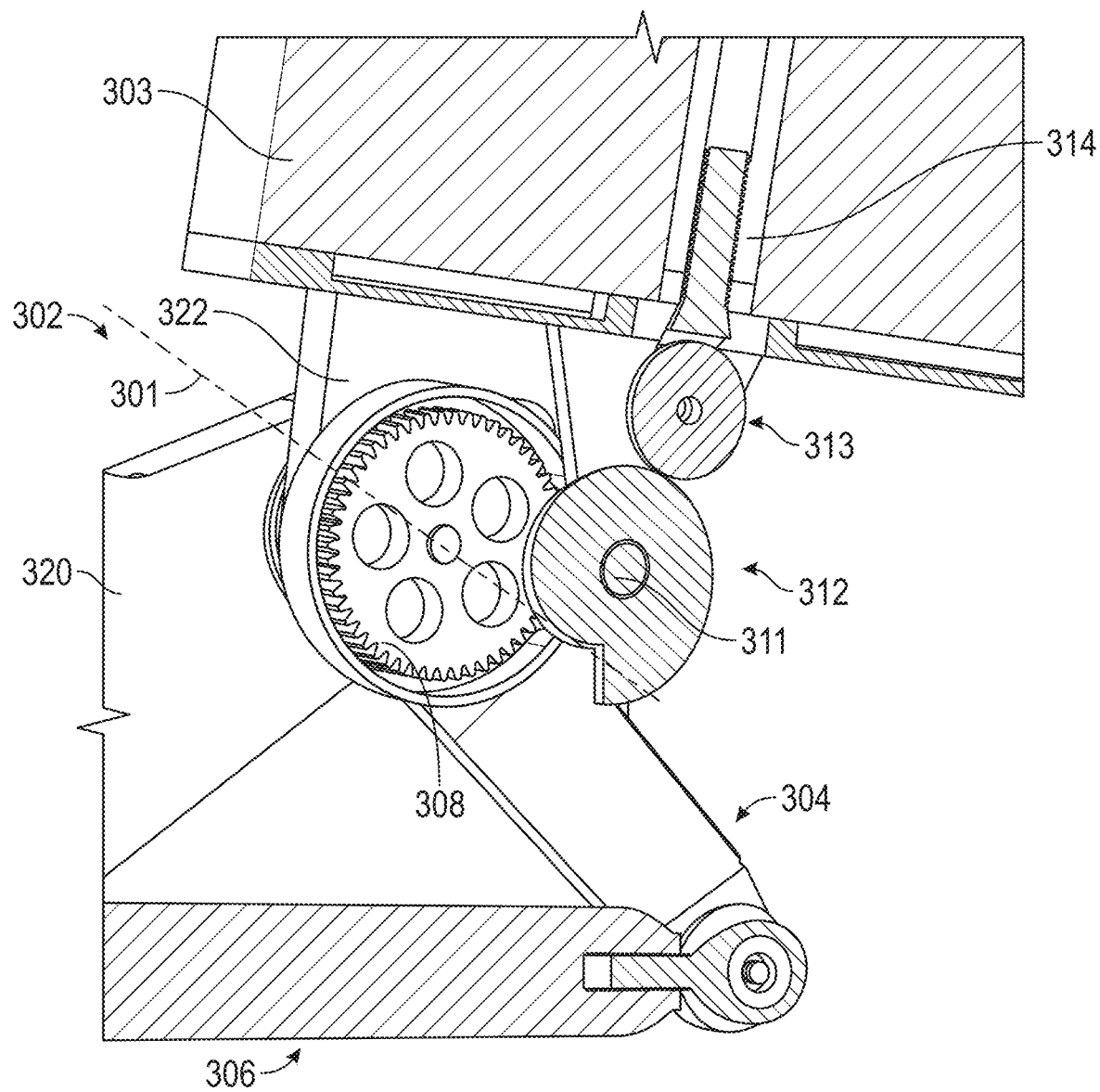
FIG. 6 shows another detail view of a portion of the exemplary system of FIG. 4, according to one or more examples of the disclosure.

FIG. 6 shows another detail view of a portion of the exemplary system 302 of FIGS. 4 and 5. Whereas FIG. 5 depicts the control rod 314 engaged with two sides of the outer surface of the cam 312 (e.g., in the corner area of the snail-shaped cam), FIG. 6 depicts the control rod 314 engaged with only one side of the outer surface of the cam 312. The position of the control rod 314 depicted in FIG. 6 compared to that of the control rod of FIG. 5 can be obtained by rotating the cam 312 in a clockwise direction such that the roller 313 moves in a counterclockwise direction as it follows the surface of the cam 312.

As the roller 313 follows the spiral portion of the cam 312, the control rod 314 may translate toward or away from the internal pin 311 at the center of the cam 312. For instance, if the cam 312 rotates in a clockwise direction, as the roller 313 follows the spiral portion of the cam 312, the control rod 314 translates away from the internal pin 311. Opposite, if the cam 312 rotates in a counterclockwise direction, the control rod 314 can translate towards the internal pin 311 as the roller 313 follows the spiral portion of the cam 312. As the roller 313 follows the circular portion of the cam 312, the control rod 314 may remain at a constant distance and not translate relative to the internal pin 311. For example, the cam 312 can include a spiral profile for the first 210 degrees of rotation, with a circular profile for the remaining 150 degrees of rotation, such that the control rod 314 only translates away from the internal pin 311 during the first 210 degrees of rotation of the cam 312. As noted above, the control rod 314 can be biased in compression against the cam 312 via a spring 315.

Figure 7:
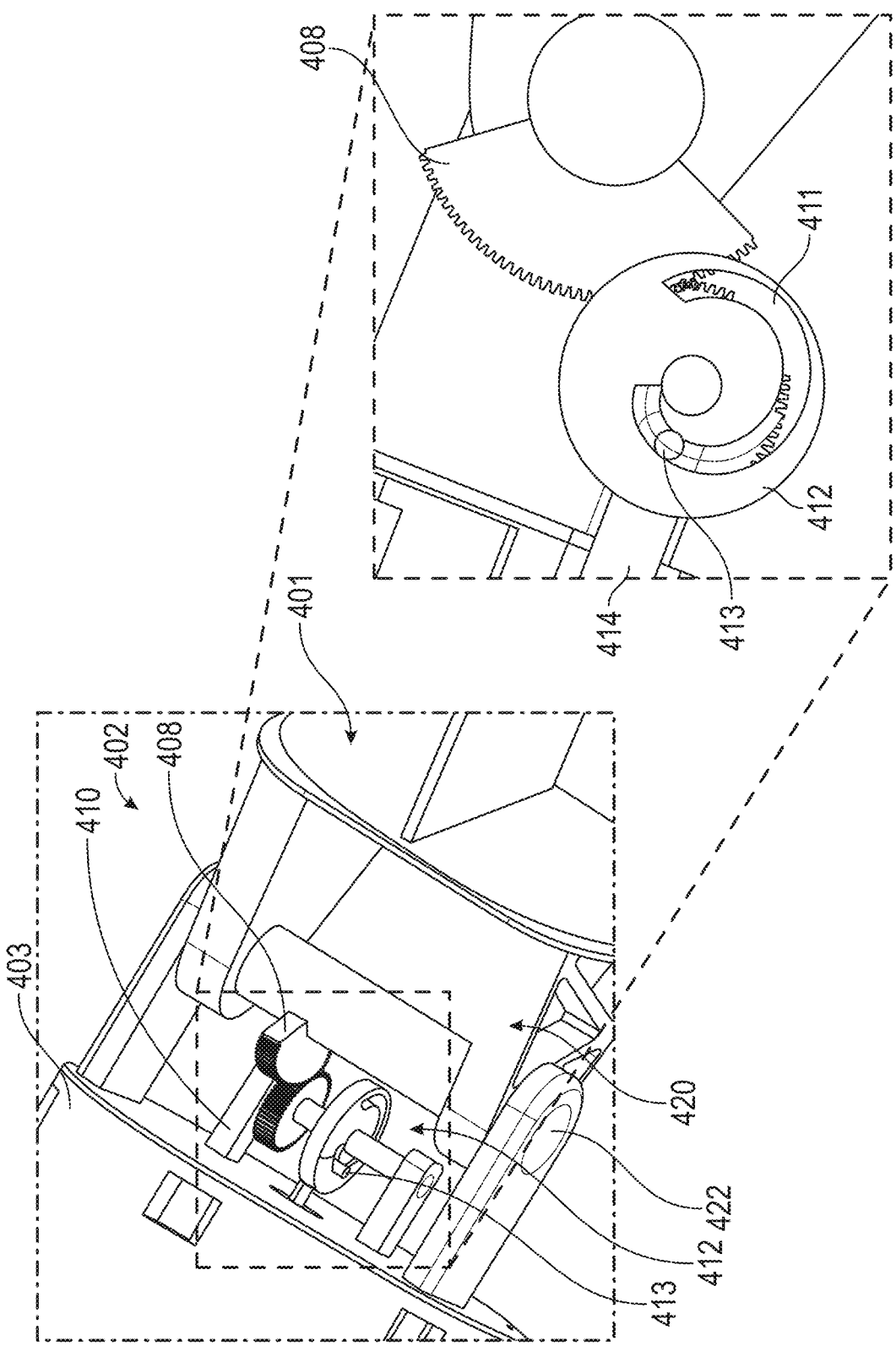
FIG. 7 shows a top perspective view and a detail view of an exemplary system, according to one or more examples of the disclosure.

FIG. 6 shows an example where the control rod 314 has a roller 313 engaged with an outer surface of the cam 312. Alternate configurations may have a different engagement between the control rod and cam. For instance, FIG. 7 shows a top perspective view of an exemplary system 402 that includes a control rod 414 with a pin 413 engaged with a track 411 of a cam 412. The pin 413 engages the track 411 of the cam 412 such that the cam 412 can both push and pull the pin 413 and the control rod as the cam 412 rotates.

The system 402 can be used for system 202 of FIG. 3. Similar to the systems discussed above, the system 402 connects a proprotor 403 to a portion of an aircraft (to a boom 401 as shown in FIG. 7). Distinct from the systems above, however, the system 402 includes a control rod 414 with a pin 413 that rides in a track. This configuration is more clearly visible the detailed pop-out of the cam 412, which shows the pin 413 of the control rod 414 engage with the track 411 in the cam 412. As the cam 412 rotates, such as by engagement with the pinion 410 rotating as it revolves around the gear 408, the pin 413 can follow the track 411, thereby translating the control rod 414.

The gear 408 can be fixed in position relative to the fixed frame 420, which is fixedly mounted to the aircraft. For instance, as shown in FIG. 7, the gear 408 is connected to the fixed frame 420. The pinion 410 can be rotatably mounted to the fixed frame 420, such that the pinion 410 is rotationally coupled to the proprotor frame 422 and moves with the proprotor frame 422.

The track 411 can include a spiral portion and a circular portion. As the pin 413 follows spiral portion of the track 411, the control rod 414 can translate toward or away from a center of the cam 412. As the pin 413 follows a circular section of the track 411, however, the control rod 414 can remain at a constant distance and not translate relative to the center of the cam 412. Optionally, the track 411 of the cam 412 can be a variety of geometries, based on the type of translation desired. To remain engaged with the track 411, the control rod 414 can be biased in compression or tension against the cam 312, such as via a spring (not shown in figure).

Figure 8:
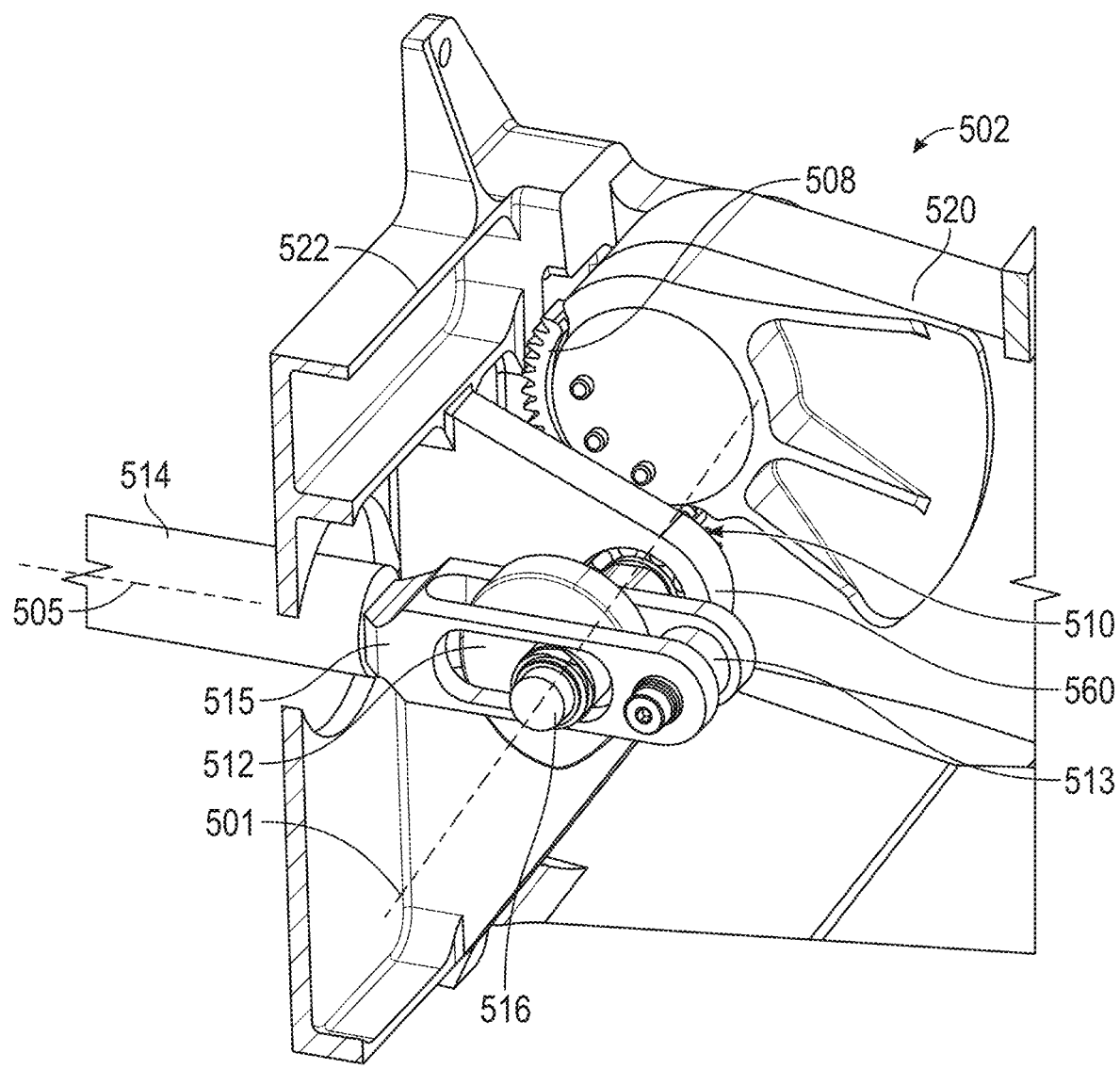
FIG. 8 shows a detail view of an exemplary system with a control rod in tension, according to one or more examples of the disclosure.

Another exemplary cam-control rod configuration is shown in FIG. 8. Unlike system 302, in system 502 the control rod 514 is held in tension. Similar to the systems described above, the system 502 can include a proprotor frame 522 rotatably mounted to a fixed frame 520 that is mounted to a portion of the aircraft (such as to the fuselage, wing, or a boom structure). The system 502 can be configured such that one or more actuators (not shown in figure) drive the proprotor frame 522 to rotate about the rotation axis 501 to tilt a proprotor mounted to the proprotor frame 522 between a vertical thrust position and a forward thrust position.

Similar to the systems described above, the system 502 includes a control rod 514 that engages a cam 512, which rotates based on an engagement with a pinion 510 engaged with a gear 508. The gear 508 can be fixed in position relative to the fixed frame 520. For instance, as shown in FIG. 7, the gear 508 is connected to the fixed frame 520. The cam 512 is fixedly connected to the pinion 510, such as via the shaft 516, so that the cam 512 rotates with the pinion 510. The pinion 510 can be rotatably mounted to the fixed frame 520, such as via a bearing mounting to rib 560, such that the pinion 510 is rotationally coupled to the proprotor frame 522 and moves with the proprotor frame 522. The pinion 510 revolves around the gear 508 as the proprotor frame 522 moves, which rotates the cam 512.

The control rod 514 includes a clevis 515 and a follower 513, which is a roller in this example. As shown, the cam 512 is engaged with the follower 513 such that the follower 513 rolls along the cam 512 as it rotates. The follower 513 is rotatably attached to the clevis 515 of the control rod 514. The control rod 514 is in tension (a force is applied—such as via one or more springs—along axis 514 to the left in the view of FIG. 8) such that the follower 513 is forced against the cam 512. Thus, as the follower 513 rolls along the cam 512, the control rod 514 may translate along axis 505 (depending on the profile of the cam 512). As above, the cam 512 can have any suitable profile that for achieving the desired relationship between blade pitch and proprotor tilt.

Figure 9:
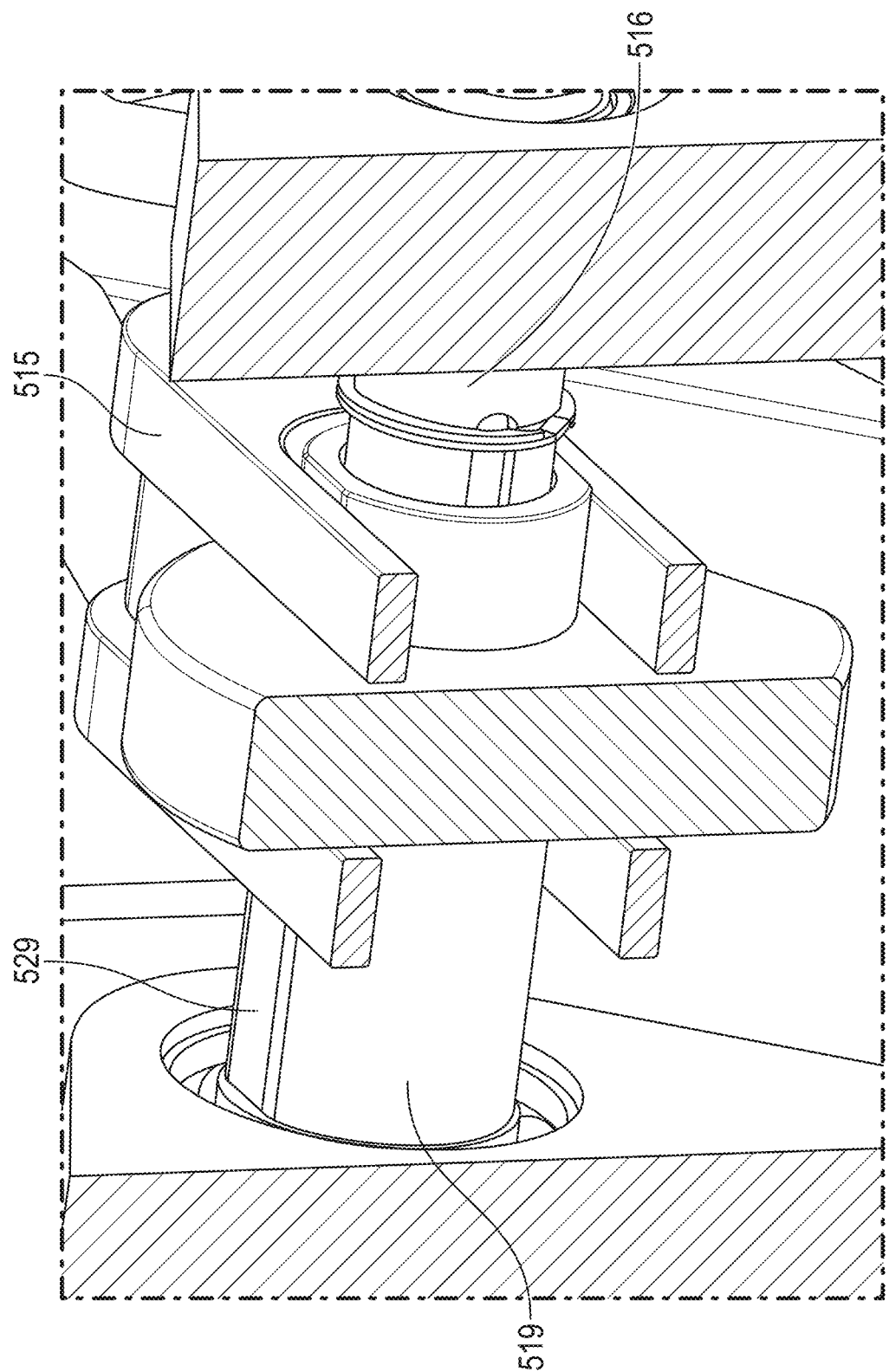
FIG. 9 shows a detail cutaway view of the bushing and cam interface of the exemplary system of FIG. 8, according to one or more examples of the disclosure.

The clevis 515 includes a slot 536 that through which the shaft 516 may extend. The clevis 515 is separated from the shaft 516 by a bushing, which is shown more clearly in FIG. 9, which shows a detail cutaway view of the bushing 519 and clevis 515 interface of the system 502 of FIG. 8. The bushing 519 can include engagement surfaces 529 on the areas of the bushing 519 that engage with the clevis 515, with the engagement surfaces 529 shaped such that the clevis 515 is prevented from rotating, which in turn prevents the control rod attached to the clevis 515 (e.g., the control rod 514 shown in FIG. 8) from rotating. As shown in FIG. 9, the engagement surfaces 529 of the bushings 519 are flat, which corresponds to flat surfaces of the clevis 515. Optionally, these surfaces may be another shape, based on the shape of corresponding surfaces of the clevis 515. For example, the engagement between the clevis 515 and the bushings 519 may involve circular, elliptical, or angled surfaces.

Figure 10:
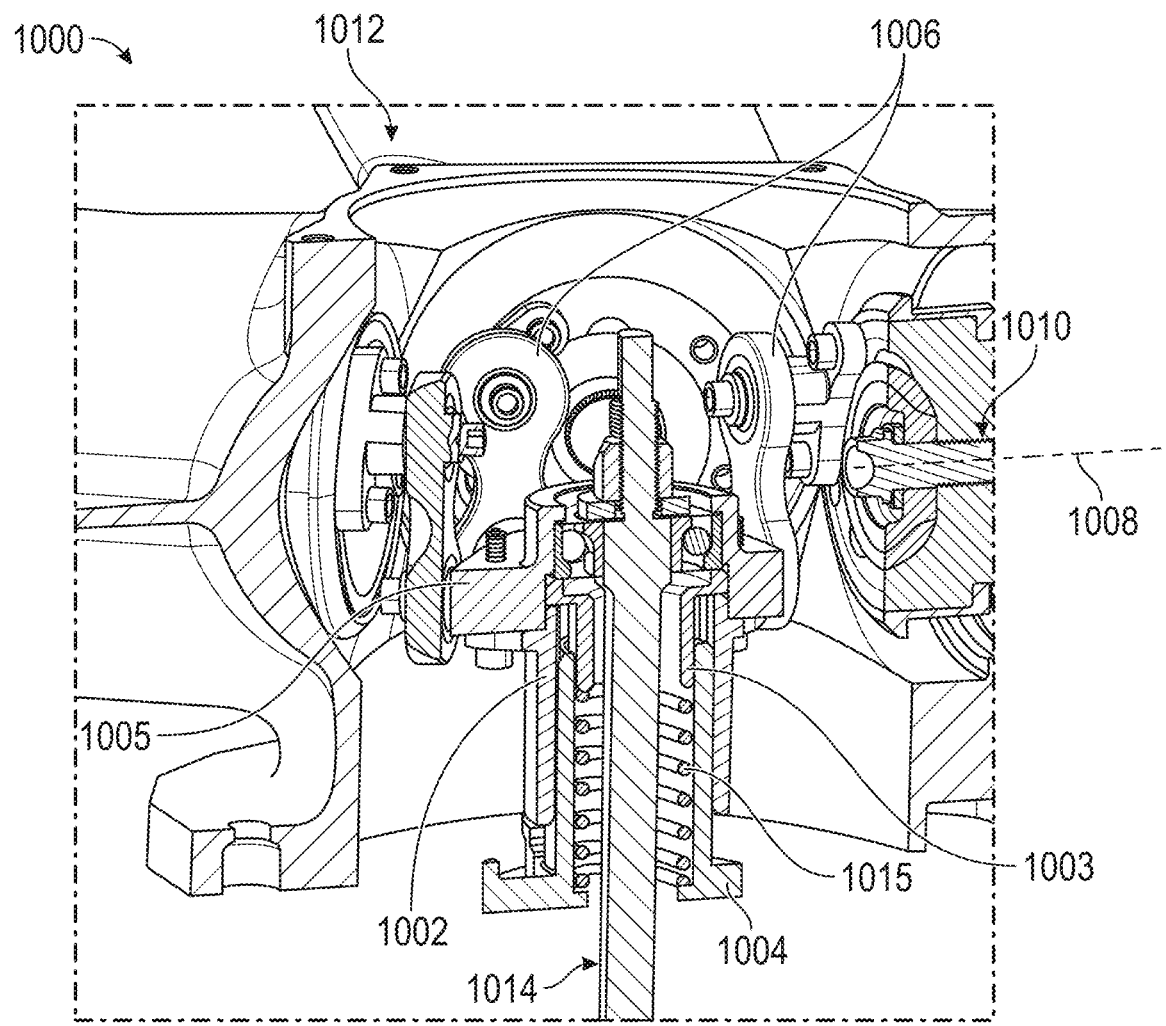
FIG. 10 shows a cutaway detail view of an exemplary hub of a proprotor, according to one or more examples of the disclosure.

As discussed above, translation of the control rod of any of the above exemplary systems can adjust the pitch angle of the blades of the proprotor. The control rod can be operatively engaged with a plurality of blades such that translation of the control rod causes rotation of the blades. FIG. 10 shows a cutaway detail view of an exemplary hub 1000 of a proprotor, showing an example of the coupling of a control rod 1014 with the blades 1012 of the proprotor, according to one or more examples of the disclosure. The hub 1000 can include an engine shaft 1004, a spring 1015, a bearing 1003, a plate 1002, a pitch plate 1005 and a number of links 1006. The blades 1012 are mounted to the hub 1000. For instance, each blade 1012 can include blade roots 1010 that connect to the links 1006. The control rod 1014 connects to the pitch plate 1005 and/or the plate 1002 of the hub 1000. The other end of the control rod 1014 can connect to a system configured to translate the control rod 1014 while tilting a proprotor, as discussed above.

The engine shaft 1004 surrounds the spring 1015 and the bearing 1003 and connects to the plate 1002 that connects to the pitch plate 1005 engaged with the links 1006. The engine shaft 1004 connects to the engine (not shown in figure) of the hub 1000. The plate 1002 is constrained in rotation by a spline interface to the engine shaft 1004 such that the plate 1002 rotates with the engine shaft 1004. The control rod 1014 is prevented from rotating along with the plate 1002 via the bearing 1003. The pitch plate 1005 connects to the blade roots 1010 via links 1006. As shown in FIG. 10, the links 1006 are dog-bone links, however other linkage types are contemplated, such as pitch links, etc. The spring 1015 can maintain the control rod 1014 in tension or compression. In the example of FIG. 10, the spring 1015 maintains the control rod 1014 in tension by pressing the control rod 1014 against the pitch plate 1005.

As the control rod 1014 translates (e.g., advances or retracts axially), the plate 1002 and/or pitch plate 1005 translates, which causes the links 1006 to adjust the pitch angle of the blades 1012 by rotating each blade 1012 about a central axis 1008 of the blade 1012. Rotating each blade 1012 about the central axis 1008 adjusts the pitch angle of the blades 1012. Accordingly, translation of the control rod 1014 can adjust the pitch angle of the blades 1012 of the proprotor.

Figure 11:
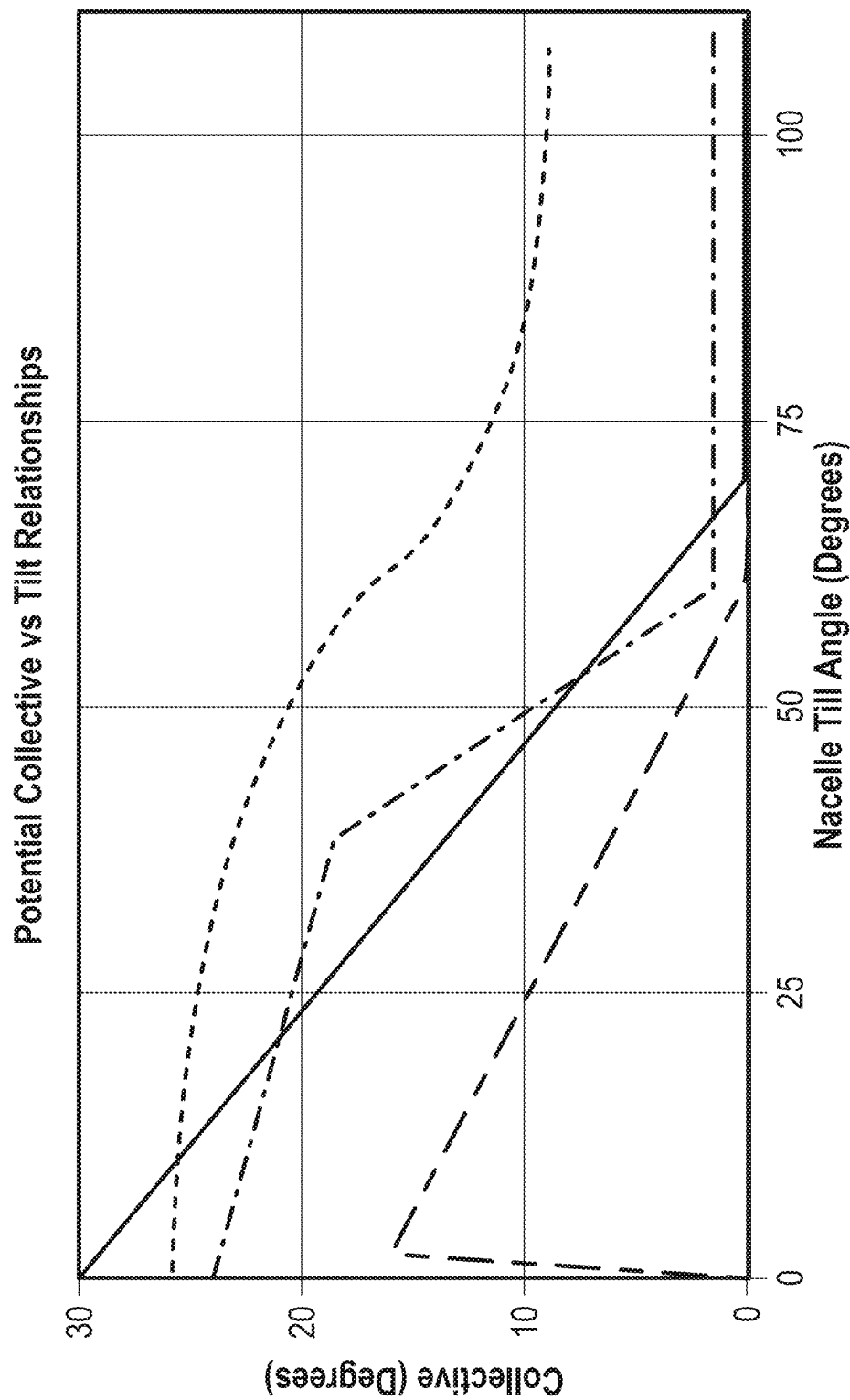
FIG. 11 shows a graph of examples of blade pitch as a function of proprotor tilt angle.

As discussed above, adjusting the pitch of the blades of a proprotor based on the tilt of the proprotor can enable the propeller operational characteristics to be tuned to the different stages of flight, which can lead to greater efficiency that can result in less energy demand over the course of the flight. The relationship between blade pitch and proprotor tilt can be selected by selecting the desired cam profile (e.g., the profile of cam 214). A wide variety of relationships between blade pitch and proprotor tilt are achievable based on the selection of the cam profile. FIG. 11 is a graph that shows examples of some of these relationships.

The graph of FIG. 11 shows blade pitch as a function of proprotor tilt angle. The proprotor tilt angle, which is provided on the X-axis of the graph of FIG. 11, is the angle of the rotational axis of the proprotor relative to a line that extends parallel to a longitudinal axis of the aircraft and intersects the rotational axis of the proprotor. The rotational axis of the proprotor is shown in the example of FIG. 2, as rotational axis 1101-A when the proprotor is in a forward flight position (rotational axis 1101-A is coincident with the line that extends parallel to the longitudinal axis 1103 of the aircraft and intersects the rotational axis of the proprotor) and rotational axis 1101-B when the proprotor is in a lift position. Zero degrees of tilt angle on the graph of FIG. 11 corresponds to the proprotor having a rotational axe that is parallel to the longitudinal axis 1103 of the aircraft—e.g., for providing forward thrust for forward flight, and ninety degrees of tilt angle corresponds to the proprotors providing vertical thrust, such as for vertical take-off and landing.

Figure 12:
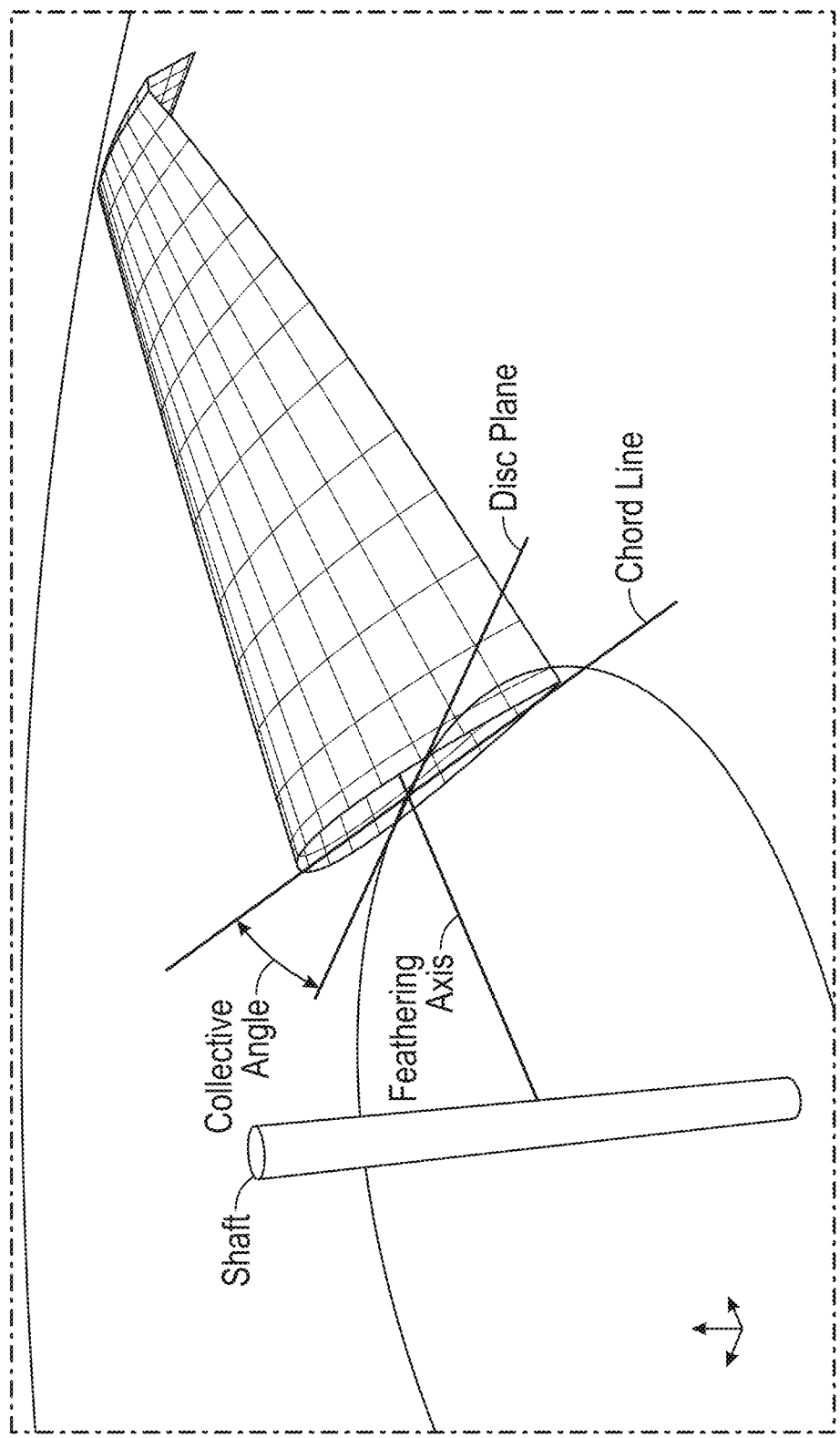
FIG. 12 is a diagram illustrating blade pitch angle.

The pitch of the blades, which is provided on the Y-axis of the graph of FIG. 11, can be defined as the angle between the chord of the blade and the plane of rotation and may be measured at a specific point along the length of the blade. FIG. 12 is a diagram showing an example of the definition of blade pitch. The blade 1208 (only one is shown for simplicity but it will be understood that each proprotor will include multiple blades) revolves about proprotor rotational shaft 1214 and is mounted such that it can rotate about a pitch axis 1206, enabling the pitch 1216 of the blade 1208 to be adjusted. The plane that contains the pitch axis 1206 and is traversed by the blade 1208 when the blade 1208 rotates can be referred to as the disc plane 1210. The pitch 1216 of the blade 1208 can be defined as the angle between the chord 1204 of the blade 1208 (a line joining the leading edge and trailing edge of the blade 1208) and a line 1202 lying within disc plane 1210 that is perpendicular to the pitch axis 1206. The pitch values shown in FIG. 11 are merely exemplary and it will be understood by a person of ordinary skill in the art that the pitch values will depend on the specific design of the blades and the location along the blades where the pitch is measured. Similarly, the proprotor tilt values shown in FIG. 11 are merely exemplary and it will be understood by a person of ordinary skill in the art that a different range of proprotor tilt could be used, including a negative tilt angle associated with the proprotor being tilted somewhat downwardly.

FIG. 11 includes four different lines 1102-1108 indicating four different relationships between blade pitch and proprotor tilt. Each line is associated with a different cam profile. Lines 1102, 1104, and 1106 have maximum blade pitches (maximums for the given line) at a zero proprotor tilt angle. This can be the blade pitch for forward flight in which the higher blade pitch can provide better efficiency at the relatively high airspeeds of forward flight.

Line 1108 has a very low blade pitch at zero proprotor tilt. This could result in the blades creating a relatively high drag at high airspeeds, which can be useful to slow down the aircraft, such as for landing. This low blade pitch may also be useful for increasing the efficiency of the proprotor at low airspeeds, such as during a conventional (airplane style) take-off. The blade pitch quickly increases to a maximum so that the proprotor need only be tilted a relatively small amount to achieve the maximum blade pitch, which may be a desirable blade pitch for forward flight. With this relationship, the proprotor need only be tilted a small amount relative to the minimum tilt (e.g., zero tilt as shown, a small positive tilt, a small negative tilt, etc.) to achieve a more optimal blade pitch for the high speeds of forward flight.

Each line 1102-1108 shows the blade pitch decreasing to a minimum blade pitch (minimum for the given relationship) that is associated with a maximum proprotor tilt—tilt that may be used for vertical flight and hover. The minimum blade pitch can be optimal for the low air speed and high thrust requirements of vertical flight and hover. Lines 1104 and 1106 demonstrate that the minimum blade pitch need not be zero. The particular proprotor tilt angle at which the blade pitch minimum is reached can be selected based on the cam profile, as demonstrated by the different locations of this point for the various relationships (e.g., point 1110).

Each relationship (represented by lines 1102-1108, respectively) is achieved by a different cam profile. Cam profiles can include multiple regions having different shaped to achieve the changes in relationship between the blade pitch and proprotor tilt of the various lines 1102-1108. For example, line 1102 can be achieved by a cam profile that includes a spiral section that corresponds to the range of zero degrees proprotor tilt to the proprotor tilt angle of point 1110. The spiral section (continuously changing radius) transitions to a circular section (constant radius) that provides for the unchanging blade pitch associated with proprotor tilt angles past point 1110. Line 1106 can be achieved by a first spiral section, followed by a second spiral section that has a different rate of change of the radius than the first spiral section, followed by a circular section. Line 1104 can be achieved by a cam profile that has continuously varying rates of change of radius.

The relationships shown in FIG. 11 are merely examples illustrating that many different relationships can be achieved by the appropriate selection of the cam profile. A person of ordinary skill in the art will understand that the desired relationship between blade pitch and proprotor tilt can be achieved by the appropriate cam profile design.

Figure 13:
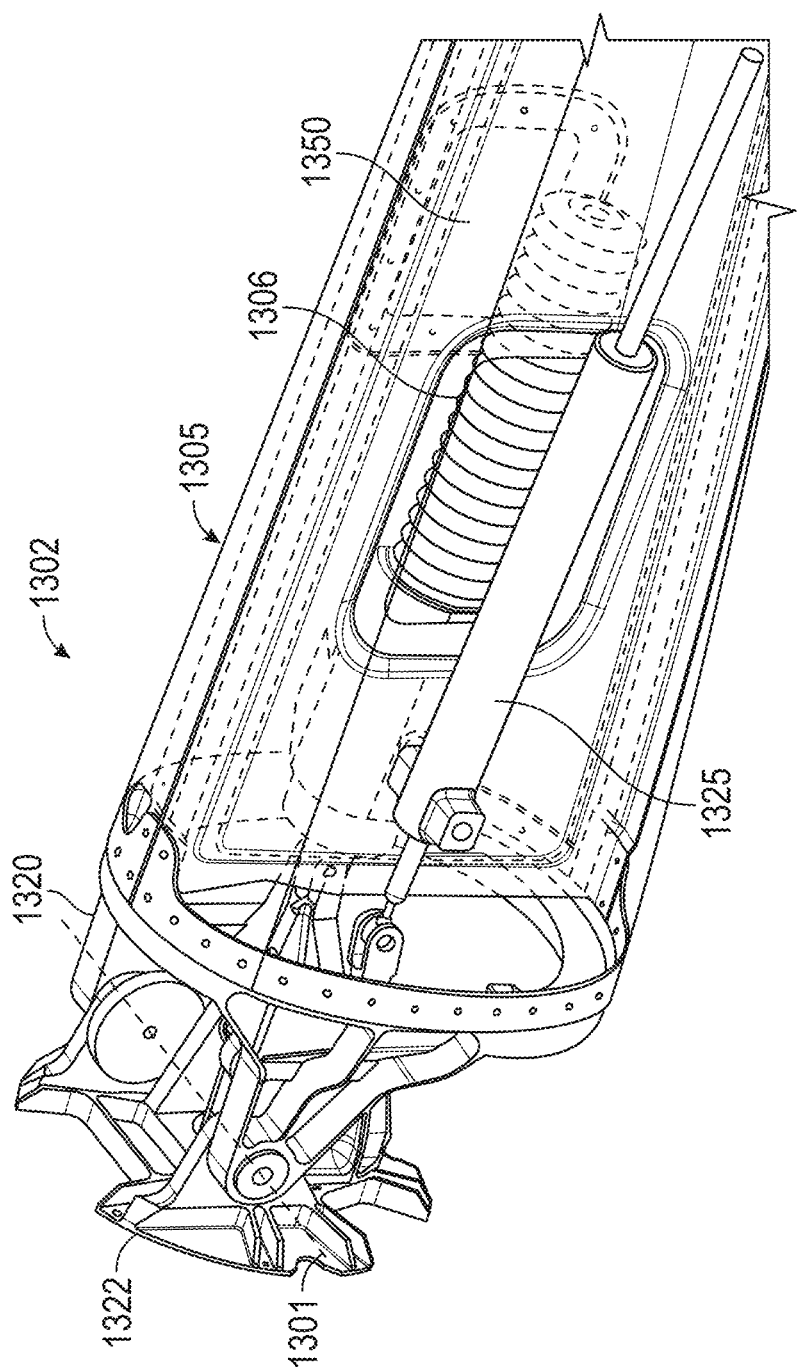
FIG. 13 shows a detail view of an exemplary system, according to one or more examples of the disclosure.

In one or more examples, any of the systems described above, such as system 202, system 302, system 402, system 502, and aircraft 100 can include a damper, as shown in the exemplary system 1302 of FIG. 13, for limiting a rate of tilt of the proprotor, such as in the event of actuator failure. The damper 1325 of system 1302 is connected between the boom 1305 of an aircraft, such as aircraft 100 of FIGS. 1 and 2, and the proprotor frame 1322, to which a proprotor (not shown) mounts. The damper 1325 can be housed within an outer shell of the boom 1305. In one or more examples, the boom 1305 can include a rib 1350, and the actuator 1306 and the damper 1325 can be positioned on opposite sides of the rib 1350. The proprotor frame 1322 is tiltably connected to the fixed frame 1320 such that the proprotor frame 1322 (and the proprotor) can tilt about rotation axis 1301. The actuator 1306 is connected to the proprotor frame 1322 and drives the tilting of the proprotor about the rotation axis 1301.

Figure 14:
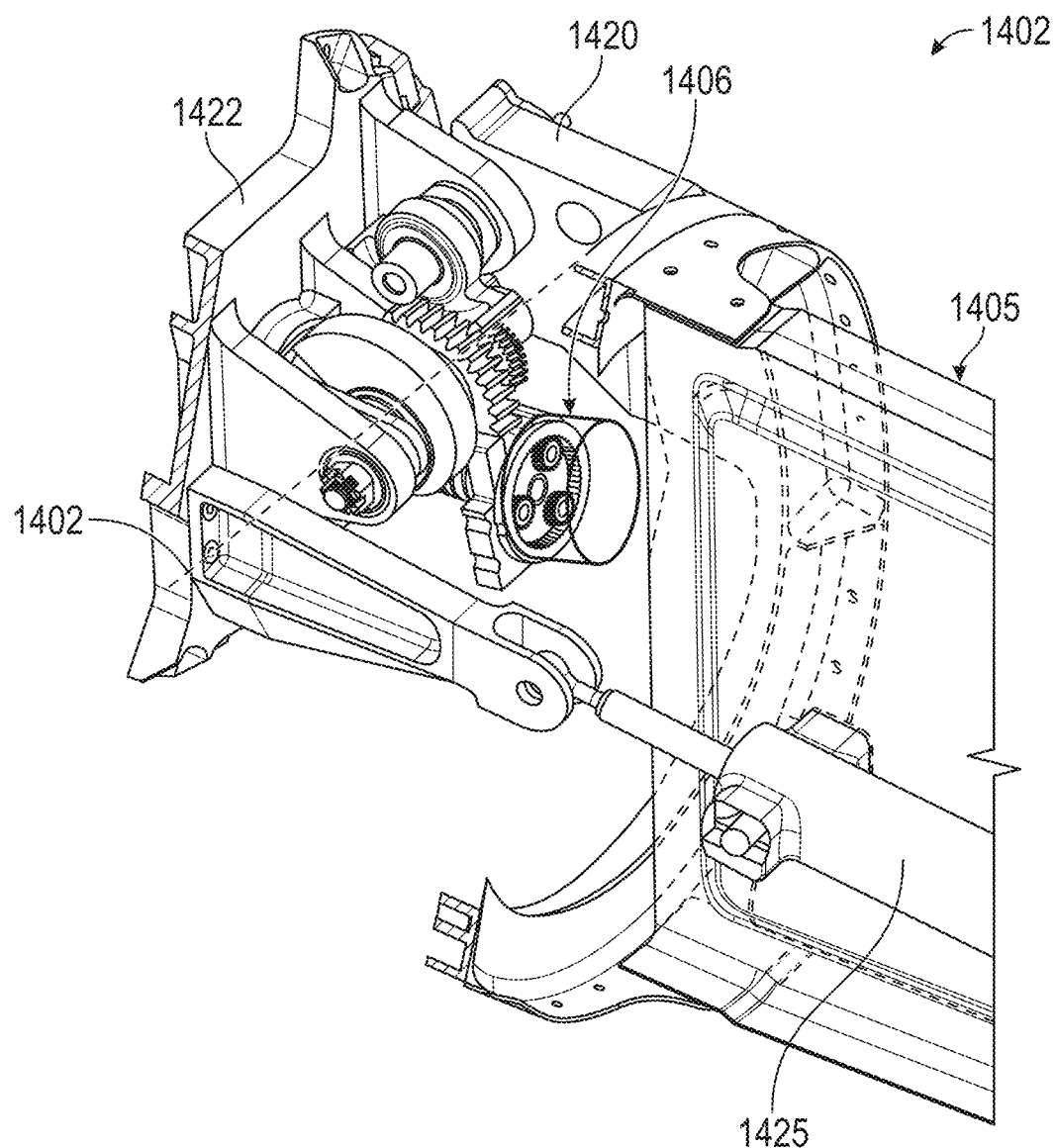
FIG. 14 shows a detail view of an exemplary system, according to one or more examples of the disclosure.

In one or more examples, the actuator 1306 can be a linear actuator. Alternatively, the actuator can be a rotary actuator, as shown in the exemplary system 1402 of FIG. 14. The system 1402 is otherwise similar to system 1302 of FIG. 13 in that it includes a damper 1425 connected between a boom 1405 of an aircraft and a proprotor frame 1422, which is tiltably connected to the fixed frame 1420 such that the proprotor frame 1422 (and the proprotor) can tilt about rotation axis 1401. System 1402 includes a rotary actuator 1406 connected to the proprotor frame 1422 that drives the tilting of the proprotor about the rotation axis 1401. In the illustrated embodiment, the rotary actuator 1406 includes an electric motor connected to a gear train that drives a worm gear. The worm gear drives a gear to rotate about the rotation axis 1401, which tilts the proprotor.

If the actuator 1306 (or actuator 1406 of FIG. 14) were to become disconnected from the proprotor frame 1322, catastrophic failure may occur, as the proprotor could begin rapidly tilting without control. In one or more examples, the system 1302 could include a second (redundant) actuator that is also connected to the proprotor frame 1322 such that if the first actuator 1306 becomes disconnected, the second actuator can nonetheless control the tilting of the proprotor about the rotation axis 1301. However, adding a second actuator may complicate the system 1302, increase cost, and add more weight to the aircraft. Rather than implementing a second actuator, the system 1302 instead includes a damper mechanism such as damper 1325. In the event that the actuator 1306 becomes disconnected from the proprotor frame 1322, the damper 1325 dissipates energy and, thereby, limits the rate of change of tilt of the proprotor, which eliminates the catastrophic result of the actuator 1306 disconnecting from the proprotor frame 1322. The damper 1325 can include a balanced hydraulic or pneumatic cylinder, which as is known in the art includes a piston that slides within a cylinder, the piston including a plurality of apertures through which fluid flows as the piston moves within the cylinder. The damper 1325 is a passive damper configured to apply a force (a hydraulic or pneumatic force) to the proprotor frame 1322 (and proprotor) only when the tilt angle of the proprotor is being adjusted (i.e., no bias is applied when the proprotor is at rest). In one or more examples, the system 1302 may include one or more redundant actuators as well as a damper mechanism such as damper 1325.

The damper 1325 can be configured to limit the rate of change of the tilt angle of the proprotor frame 1322 in both tilt directions. The damper 1325 can be positioned such that a force vector of the damper 1325 can extend beneath the tilt axis, such as tilt axis 118 of FIG. 2. In one or more examples, the damper 1325 can be configured to limit the rate of change of the tilt angle of the proprotor to a predetermined threshold value in the event that the actuator 1306 becomes disconnected from the proprotor frame 1322.

In one or more examples, controlling an aircraft that includes one or more dampers, as discussed above can include receiving a command at a controller to adjust a tilt angle of a tiltable proprotor that is tiltable between a lift position for providing lift for the aircraft and a forward flight position for providing forward propulsion for the aircraft, and controlling at least one actuator to adjusting the tilt angle of the tiltable proprotor according to the command, wherein at least one passive damper is connected to the tiltable proprotor to limit a rate of change of the tilt angle of the tiltable proprotor. As described further below, a fail-safe latch mechanism may be used in addition to or as an alternative to the second actuator or damper mechanism for preventing the proprotor from rapidly tilting without control.

Joint Assembly with Fail-Safe Latch

As explained above, a damper can be used for limiting the rate of change of tilt of the proprotor in the event of actuator disconnection. An additional or alternative approach for mitigating the effects of actuator disconnection is a joint assembly that includes a fail-safe latch according to the principles described herein. In place of or in addition to the damper described above, a joint assembly provided between the actuator and tiltable proprotor may be configured to automatically latch in the event of actuator disconnection to prevent catastrophic failure through uncontrolled tilting of the proprotor. The joint assembly may provide similar catastrophic failure protection for additional aircraft components typically controlled by actuators, including wing flaps (e.g., control surfaces/flaperons), in the event of actuator disconnection. As discussed above, the possibility of catastrophic failure resulting from actuator disconnection is often mitigated by introducing redundant actuators or damping mechanisms, but these mitigation methods can be costly and introduce undesired additional weight into the aircraft design. As such, the joint assembly described herein provides for a less massive and cost-efficient catastrophic failure prevention method.

Joint Assembly with Fail-Safe Latch for Tiltable Proprotor

Figure 15:
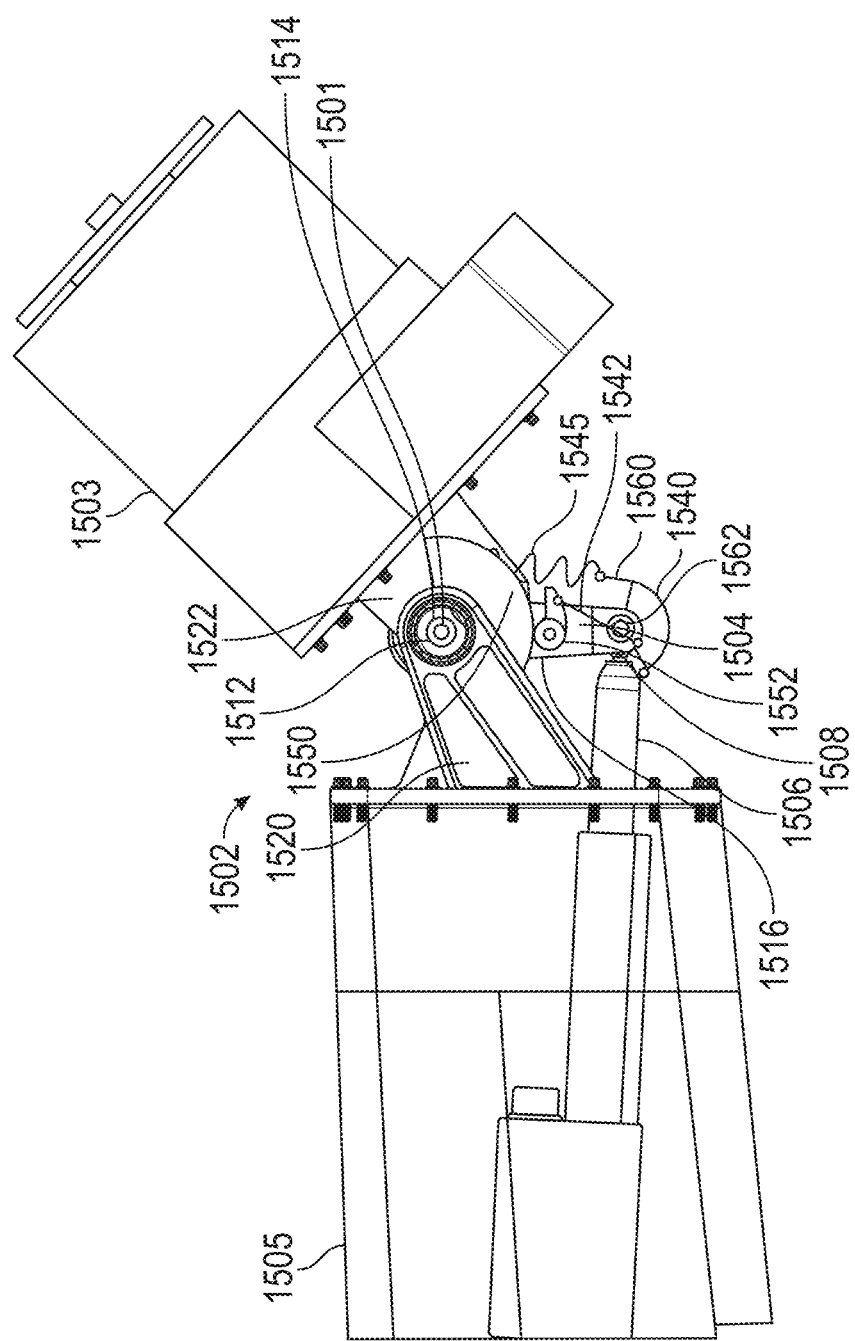
FIG. 15 shows a side view of an exemplary system in a first configuration, according to one or more examples of the disclosure.

In one or more examples, any of the systems described above, such as system 202, system 302, system 402, system 502, system 1302, system 1402, and aircraft 100 can include a tilt rotor lock mechanism, as shown in the exemplary system 1502 of FIG. 15, which shows a side view of the system 1502 in a first configuration, according to one or more examples of the disclosure. The system 1502 can be implemented in an aircraft with a tiltable proprotor instead of, or in addition to, redundant actuators and/or a damper mechanism, and can lock the tilt of the proprotor in place.

System 1502 can include a joint 1512 that rotationally mounts a proprotor to a support structure of the aircraft (e.g., to boom or other structural support). The joint 1512 can include a fixed frame 1520 for mounting to the aircraft and a proprotor frame 1522 to which the proprotor 1503 mounts. The proprotor frame 1522 is tiltably connected to the fixed frame 1520, such as via one or more bearing assemblies 1514.

The system 1502 can include one or more arm(s) 1504 fixedly connected to the proprotor frame 1522. A linear actuator 1506 can be connected to the arm(s) 1504 using a connecting portion 1508 of the actuator 1506. The connecting portion of the actuator rotatably connects to a shaft 1562 extending between arms 1504 such that the linear translation of actuator 1506 can be used to tilt the proprotor 1503 about a rotational axis 1501 of the joint assembly. The actuator 1506 can be, for example, a ball screw actuator, a hydraulic actuator, or a pneumatic actuator.

The system 1502 includes a fail-safe latch 1516 to prevent uncontrolled tilting of the proprotor 1503 about joint 1512 in the event actuator 1506 becomes disconnected from the connecting portion 1508 due to a break in the actuator shaft. The fail-safe latch 1516 includes a moveable pawl 1552 rotatably connected to the arms 1504 and configured to engage stops fixedly connected to the fixed frame 1520 in the event the actuator 1506 becomes disconnected from the arms 1504, thereby preventing rotation of the arms 1504, and in turn, the proprotor frame 1522 relative to the fixed frame 1520 in at least one rotational direction.

The moveable pawl 1552 is operatively connected to a pulley 1540 via a connector 1542. A tension spring 1545 is connected to the pulley 1540 via cable 1560, which biases the pulley 1540 counterclockwise with respect to the view in FIG. 15. The pulley 1540 is fixedly connected to the connecting portion 1508 of the actuator 1506 such that the pulley 1540 does not move relative to the connecting portion 1508. In normal operation, the pawl 1552 can rotate relative to the arms 1504 based on the movement of the pulley 1540, with the pawl 1552 configured to move towards the sector gear 1550 as the pulley 1540 moves in the direction of extension of the actuator 1506 (counterclockwise away from boom 1505 in the view of FIG. 15), but the pawl 1552 and sector gear are configured such that the pawl 1552 does not engage the sector gear 1550 so long as the actuator remains connected to the pulley 1540 by connecting portion 1508. Thus, the actuator 1506 can tilt the proprotor to a minimum and maximum tilt without causing the pawl 1552 to engage the sector gear 1550.

Figure 16:
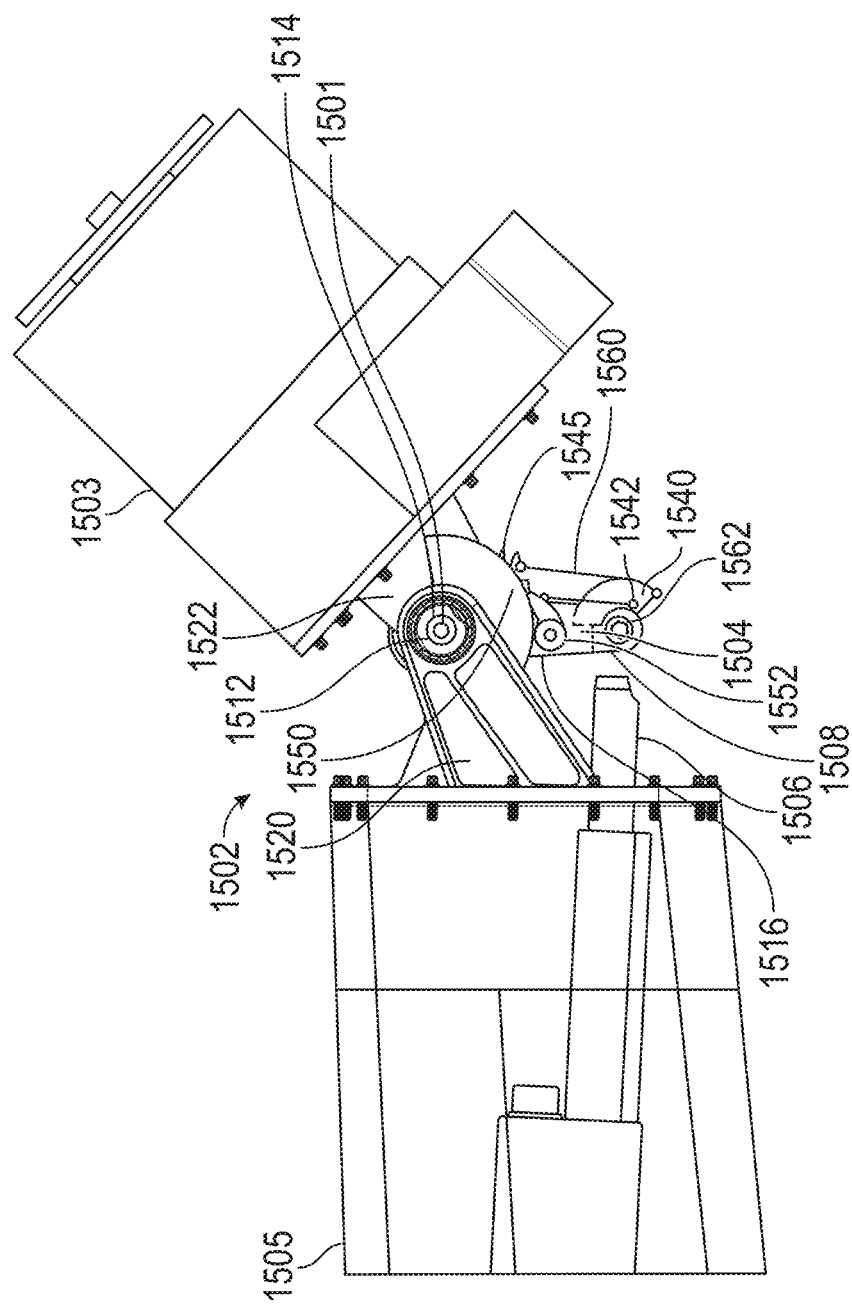
FIG. 16 shows the exemplary system of FIG. 15 in a second configuration, according to one or more examples of the disclosure.

In the event of a break in the actuator shaft causing the connecting portion 1508 of the actuator connected to the pulley 1540 to become disconnected from the rest of the actuator, the pulley 1540 and connecting portion 1508 of the actuator 1506 are free to rotate about shaft 1562 and, as such, rotate counterclockwise relative to the view in FIG. 15 due to the bias from the spring 1545, as shown in the configuration of system 1502 shown in FIG. 16. The counterclockwise movement (relative to the view in FIGS. 15 and 16) of the pulley 1540 will cause connector 1542 to move upward relative to the view in FIGS. 15 and 16, thus causing the pawl to engage with the sector gear 1550. As such, a break in the shaft of actuator 1506 will result in the pawl engaging the sector gear (teeth of the sector gear serving as stops for engagement by the pawl) and preventing tilting of the proprotor 1503 in one or both directions.

Whereas the FIG. 15 shows the pawl 1552 not engaged with the sector gear 1550 and the pulley 1540 located adjacent to the actuator 1506, FIG. 16 shows the pawl 1552 engaged with the sector gear 1550 and the pulley 1540 no longer located adjacent to the actuator 1506. The tension spring 1545 can automatically draw the pulley 1540 away from the actuator 1506 in the event that the actuator 1506 and pulley 1540 become disconnected, thereby forcing the pawl 1552 to engage the sector gear 1550. When the pawl 1552 engages the sector gear 1550, the proprotor can be prevented from tilting further in one or both directions. By preventing further tilting in one or both directions, the system 1502 can prevent catastrophic failure from occurring should the actuator become disconnected from the proprotor without requiring redundant actuators, or damping mechanisms.

Figure 17:
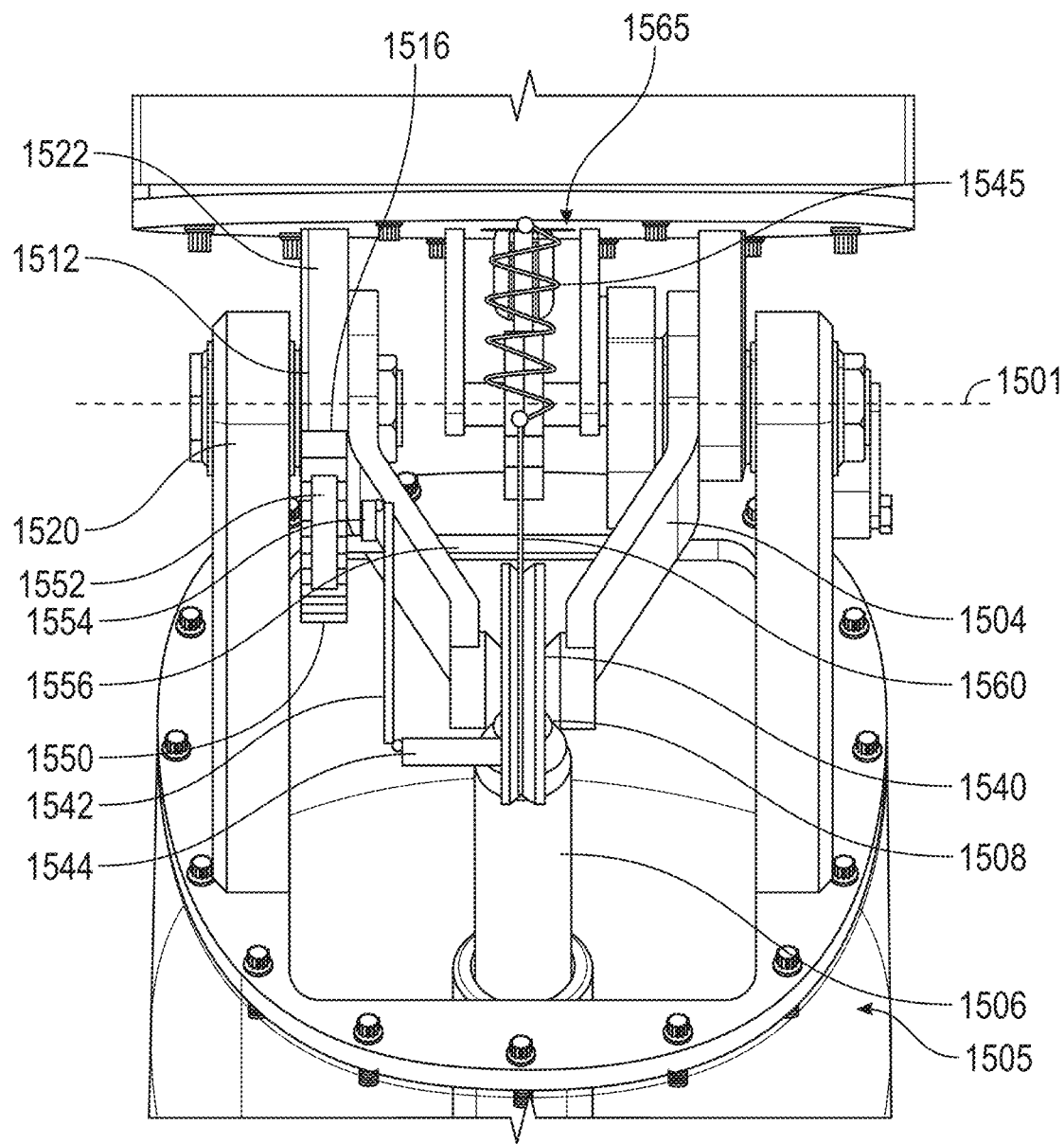
FIG. 17 shows a front view of the exemplary system of FIG. 15, according to one or more examples of the disclosure.

FIG. 17 shows a front view of the exemplary system of FIG. 15, according to one or more examples of the disclosure. FIG. 17 provides an alternative view of tension spring 1545 connected to a pulley 1540 via connector 1560 and to the proprotor 1503 via connector 1565, with the pulley 1540 also connected via connector 1542 to a pawl 1552. The connector 1542 operatively connecting the pawl 1552 to pulley 1540 is fixedly attached on a first end to a rod 1554. The rod 1554 is operatively connected to the pawl 1552 via a shaft 1556 such that upward movement of the rod 1554 relative to the view shown in FIG. 17 causes the pawl to move toward the sector gear 1550. The connector 1542 is fixedly attached on a second end to a rod 1544 that is fixedly attached to the pulley 1540.

The pulley 1540 is rotatably connected between the arms 1504 such that the pulley 1540 can rotate between the arms 1504. The pawl 1552 is rotatably connected to the arms 1504 by the shaft 1556, which extends from the pawl inwardly through the first arm 1504 to the second arm 1504. The sector gear 1550 is fixedly attached to fixed frame 1520. As shown, the tension spring 1545 is biased upward with respect to the view illustrated in FIG. 17, such that if the shaft of actuator 1506 breaks and becomes disconnected from connecting portion 1508, thus causing the rest of the actuator 1506 to become disconnected from the proprotor 1503, the force from the tension spring 1545 causes the pulley 1540 and rod 1544 to automatically rotate upward. This upward movement of the pulley 1540 and rod 1544 causes upward movement of connector 1542, thereby causing the rod 1554 and, in turn, pawl 1552 to rotate upward into engagement with the sector gear 1550. Because the sector gear is fixedly attached to the fixed frame 1520, if the pawl rotates to engage with the sector gear, the proprotor 1503 is prevented from rotating relative to the fixed frame about rotation axis 1501 in at least one direction.

Figure 18A:
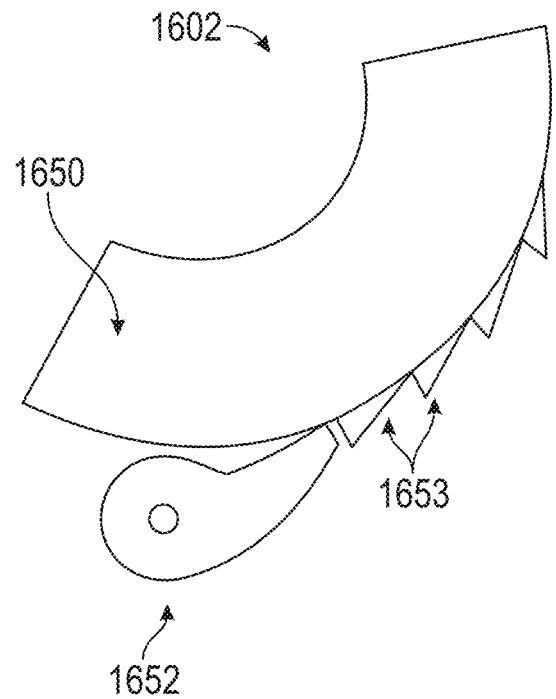
FIG. 18A shows an exemplary ratchet configuration and FIG. 18B shows an exemplary lock configuration for locking a proprotor in at least one direction.

In one or more examples, the sector gear 1550 can be configured as a ratchet with ridges for engagement by the pawl 1552 such that rotation is permitted in one rotational direction but prevented in the other rotational direction. An example of this is shown in FIG. 18A, which shows an exemplary ratchet configuration 1602, according to one or more examples of the disclosure. The ratchet configuration 1602 includes a sector gear 1650 that has a number of ridges 1653 that have a sloped side and a straighter side. The pawl 1652 rides over the sloped sides but catches on the straighter sides. As such, the proprotor will be able to tilt in a first direction (e.g., permitted to tilt counterclockwise in the illustrated configuration) but not a second direction (e.g., not permitted to tilt clockwise in the illustrated configuration). This may be useful in permitting the proprotor to move to a desired failure state tilt angle, such as a lift configuration, in which the proprotor can still be used during at least a portion of the flight. Alternatively, the ratchet may be configured to permit the proprotor to move to the forward flight configuration (e.g., to tilt clockwise in the illustrated configuration of 18A). Such a ratchet mechanism could also be used with any of the damper configurations described above to provide a slower rate of tilt in the ratcheting direction.

Figure 18B:
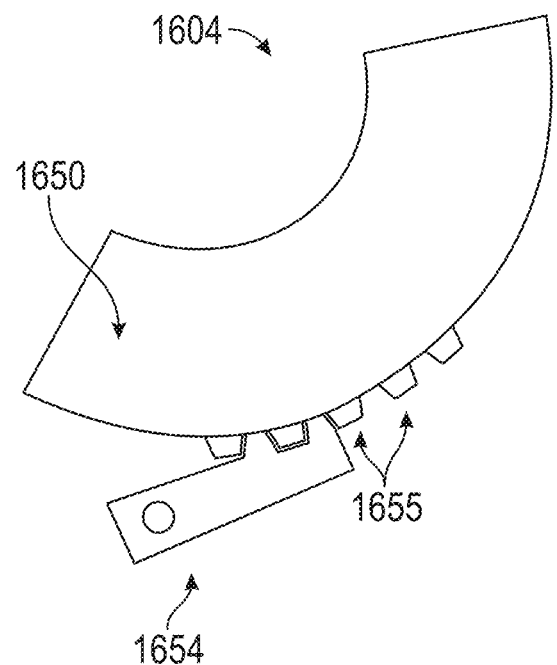

Alternatively, the sector gear and pawl can be configured to lock the proprotor in both directions. FIG. 18B illustrates an exemplary lock configuration 1604 that has a sector gear 1650 that has a number of ridges 1655 that have two straight sides and a locking mechanism 1654 that engages the ridges 1655. When the locking mechanism 1654 is forced against the sector gear 1650, the locking mechanism will engage with the ridges 1655. The locking mechanism 1654 will be unable to ride past the ridges 1655 in either direction because of their straight sides, locking the sector gear 1650 (and, thereby, the proprotor) in position.

Accordingly, described herein are systems and methods for mechanically linking the tilt of a proprotor of an aircraft with the pitch of blades of the proprotor. The systems enable blade pitch to be tailored to the different operational regimes of the proprotor while avoiding the need for dedicated blade pitch adjustment actuators and the cost, weight, and failure points associated with such dedicated blade adjustment actuators.

Figure 19:
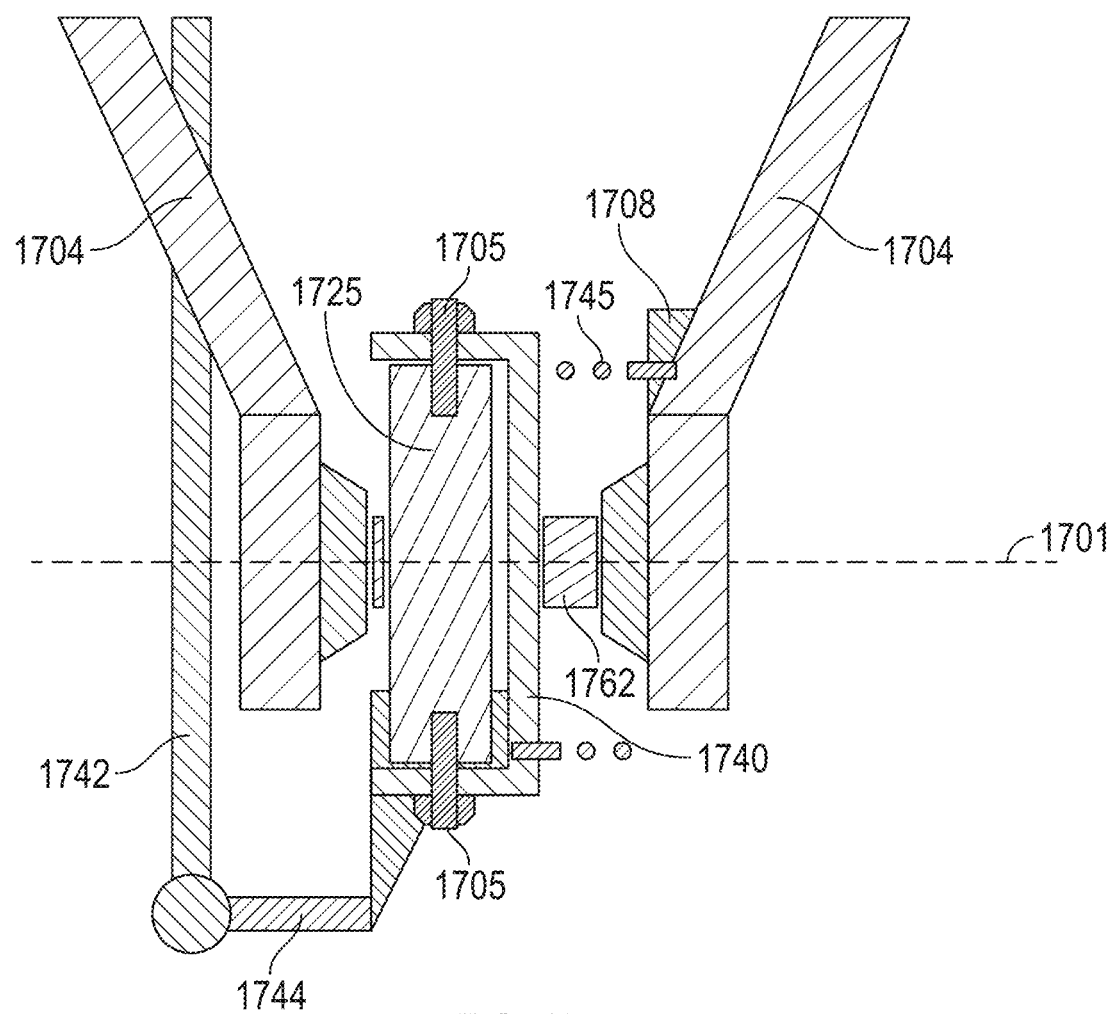
FIG. 19 shows a front view of an exemplary system, according to one or more examples of the disclosure.

FIG. 19 illustrates a tilt-rotor lock mechanism as shown in system 1702 including an alternative spring configuration to the tilt-rotor lock mechanism shown in FIGS. 15-17. System 1702 can include a joint that rotationally mounts a proprotor to a support structure of the aircraft (e.g., a boom or other structural support), for instance, in the manner described above with respect to the joint 1512 and proprotor 1503 shown in FIGS. 15-17. The joint can include a fixed frame, such as fixed frame 1520 shown in FIGS. 15-17, for mounting to the aircraft (e.g., the proprotor can be connected to boom via a bracket of the fixed frame) and a proprotor frame, such as proprotor frame 1522 shown in FIGS. 15-17, to which the proprotor mounts. The proprotor frame can be tiltably connected to the fixed frame such as via one or more bearing assemblies, for instance, the bearing assemblies 1514 shown above in FIGS. 15-17.

The system 1702 can include one or more arm(s) 1704 fixedly connected to the proprotor frame, and a linear actuator, such as actuator 1506 shown in FIGS. 15-17, can be connected to the arm(s) 1704 via a rod end fitting 1725 to tilt the proprotor. The rod end fitting 1725 rotatably connects to a shaft 1703 extending between arms 1704 such that the linear translation of actuator can be used to tilt the proprotor about a rotational axis of the joint assembly, such as rotational axis 1501 shown above in FIGS. 15-17. The actuator can be, for example, a ball screw actuator, a hydraulic actuator, or a pneumatic actuator.

The system 1702 can include a fail-safe latch, similar to the fail-safe latch described above with reference to FIGS. 15-17, to prevent uncontrolled tilting of the proprotor in the event the rod end fitting 1725 becomes disconnected from the rest of the actuator (e.g., by a break in the shaft of the actuator). The fail-safe latch can include a moveable pawl operatively connected to the proprotor frame (for instance, via a shaft that rotatably connects the pawl to the arms 1704, the arms being fixedly connected to the proprotor frame). The moveable pawl can be configured to engage stops fixedly connected to the fixed frame, for instance as described with reference to FIGS. 15-17, in the event the actuator becomes disconnected from the arms 1704, thereby preventing rotation of the proprotor frame relative to the fixed frame in at least one rotational direction.

As depicted in FIG. 19, the tension spring 1545 and cable 1560 depicted in FIGS. 15-17 are replaced by a single compact torsion spring 1745. The torsion spring 1745 can be fixedly attached at a first end to an arm 1704 at attachment point 1708, which can be a mounting bracket or other mounting component, and fixedly attached at a second end to a bracket 1740. The bracket 1740 can be attached to the rod end fitting 1725 using one or more fasteners 1705.

A rod 1744 fixedly attached to connector 1742 protrudes from bracket 1740. The connector 1742 extends upwardly from the rod 1744 to a corresponding rod (not shown) operatively attached to a pawl (not shown), for instance, in the manner described above with reference to the rod 1554 and pawl 1552 shown in FIGS. 15-17. As such, if the rod end fitting becomes disconnected from the actuator (e.g., if the actuator shaft breaks), the torsion spring 1745 will force the bracket 1740 to rotate, thus forcing the rod 1744 to rotate upward, which will in turn force the connector 1742 upward causing the pawl to engage with the sector gear substantially as described above with regard to FIGS. 15-18B. Use of a single torsion spring as described herein may reduce the overall mass and volume of the system and increase lifespan/ruggedness compared to the tension spring and cable system shown in FIGS. 15-17.

The system 1702 may be configured for providing a "mid-life" check capability to ensure that the pawl mechanism is not jammed. As described above, the system 1702 can include one or more fasteners 1705 that attach the bracket 1740 to a rod end fitting 1725 connected to the actuator shaft which can be removed to ensure that the pawl mechanism is not failed dormant (jammed). Upon removal of the fasteners, the bracket 1740 is free to rotate relative to the rod end fitting 1725, and, therefore, the spring 1745 causes the bracket 1740 to rotate, thus forcing connector 1742 to move upward. The upward movement of connector 1742 causes the pawl to move into engagement with the sector gear, substantially as described above with reference to FIGS. 15-18B. The actuator can then be driven to ensure that the proprotor does not rotate or rotates only for a short distance, thereby ensuring that the pawl has engaged the sector gear.

It should be understood that the examples described above are only meant to be illustrative. Many alternative configurations could be used to prevent the rotational movement in one or both directions of the proprotors described herein. For instance, described below is a joint assembly that includes a fail-safe latch for use with a rotary actuator for preventing uncontrollable movement of a control surface that is driven by a rotary actuator. A similar configuration to that described below could also be implemented to prevent uncontrollable movement of proprotors when driven by a rotary actuator. Additionally, the joint assembly described above could be implemented to prevent uncontrollable movement of a control surface that is driven by a linear actuator.

Joint Assembly with Fail-Safe Latch for Adjustable Control Surface Using Rotary Actuator As noted above, a joint assembly including a fail-safe latch can be configured for preventing uncontrolled tilt of other tilting components of an aircraft. For example, a joint assembly including a fail-safe latch can be used to tiltably mount a control surface of an aircraft. The systems described in detail below with regard to FIGS. 20-23 include an alternative joint assembly having a fail-safe latch that can be used for adjusting various control surfaces of an aircraft. Control surfaces are often provided on the trailing edge of an aircraft wing to adjust aerodynamic characteristics of the aircraft during takeoff, landing, and throughout a flight. Control surfaces may also be provided on other aircraft components, for instance as elevators on a stabilizer at the rear of the aircraft or on a leading edge of the aircraft wing. While the embodiments described below make specific reference to a control surface, it should be understood that the system including the joint assembly described below may be implemented with respect to various other moveable aircraft components, for instance, the tiltable proprotors described above with reference to FIGS. 15-17.

Figure 20:
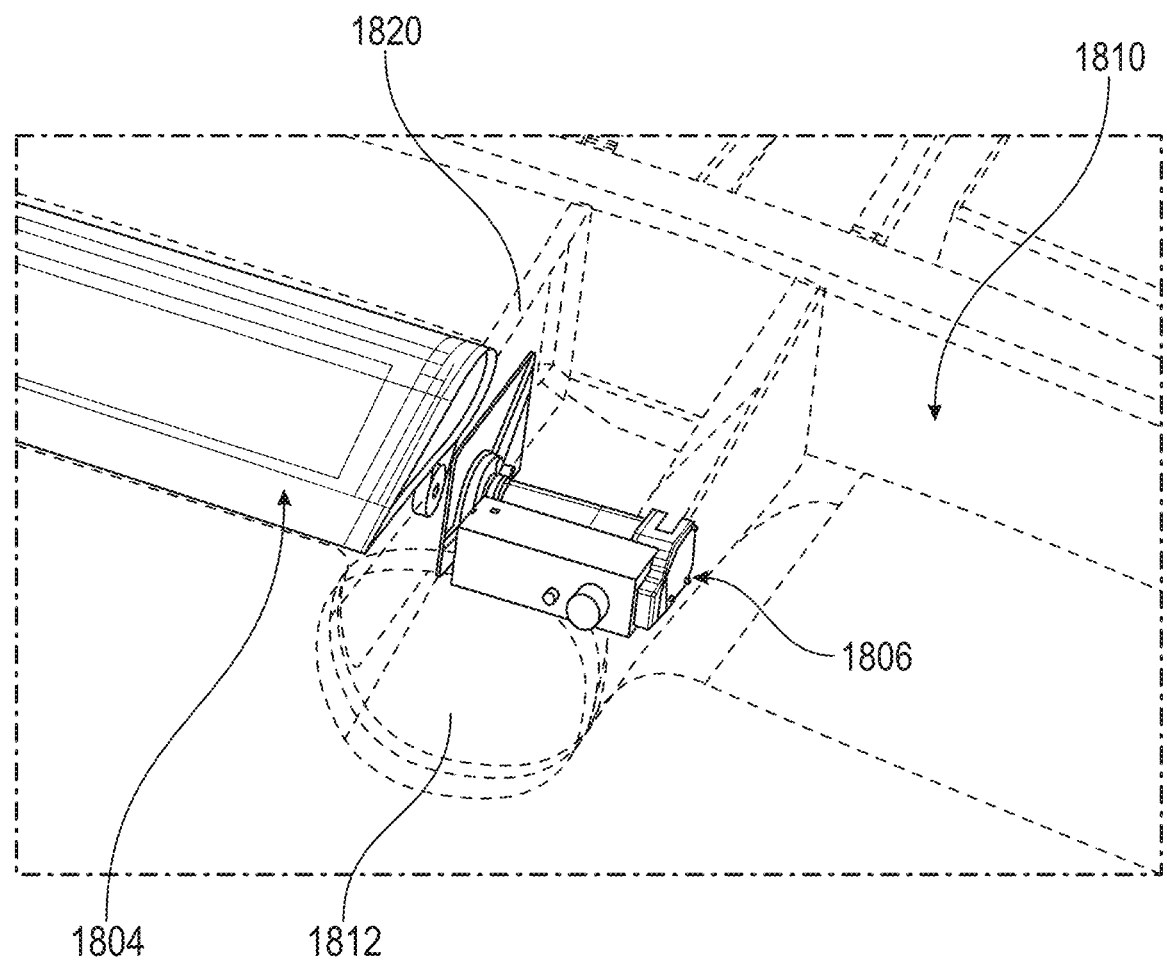
FIG. 20 shows aspects of a tiltable control surface, according to one or more examples of the disclosure.

In one or more examples, any of the systems described above, such as system 202, system 302, system 402, system 502, system 1302, system 1402, system 1502, system 1702, and aircraft 100 can include a control surface (e.g., aileron, flaperon, elevator) lock mechanism, as shown in the exemplary system 1802 of FIG. 20, which provides a detailed view of the system 1802.

The system 1802 includes an actuator 1806 connected to a control surface 1804 of wing 1810. The actuator 1806 and control surface 1804 are mounted on either side of a fixed frame 1820 of a boom 1812 on the wing 1810. The system 1802 can include a joint assembly that includes a fail-safe latch, such as that of system 1902 described in detail below with reference to FIGS. 21 and 22. The joint assembly can operatively connect the actuator to the control surface such that the actuator 1806 can be used to rotate the control surface in order to control various aerodynamic characteristics of the aircraft.

Figure 21:
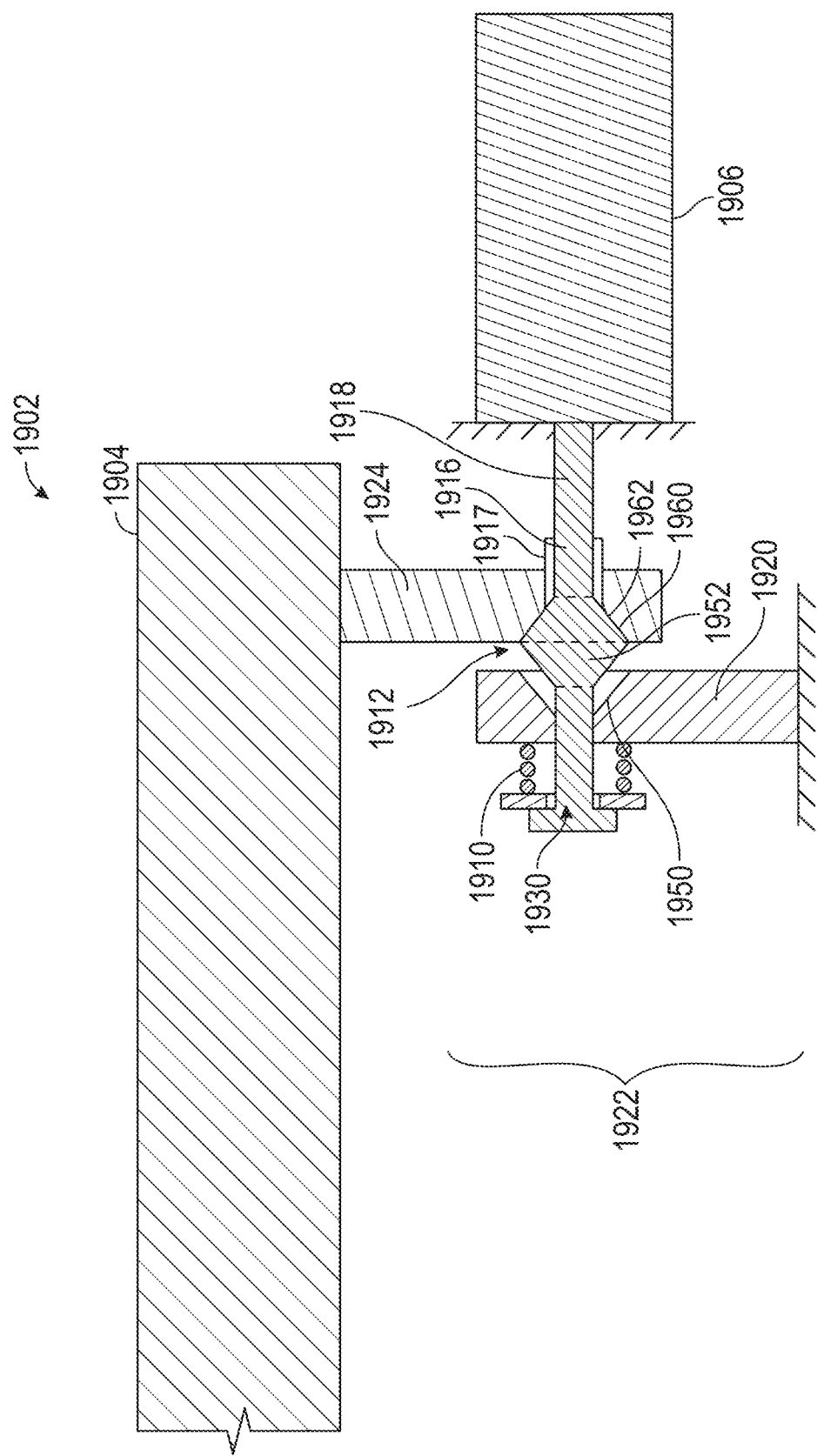
FIG. 21 shows a top view of an exemplary control surface tilting system in a first configuration, according to one or more examples of the disclosure.

FIG. 21, shows a top view of system 1902 in a first configuration, according to some examples of the disclosure. The system 1902 includes a joint assembly with a fail-safe latch for adjusting a control surface of an aircraft. The system 1902 can be implemented in an aircraft with adjustable control surfaces instead of, or in addition to, redundant actuators, a damper mechanism, and/or control surface mass balancing and can lock the position of the control surface in place in at least one direction in the event an actuator shaft driving tilting of the control surface breaks such that the control surface becomes disconnected from the separated portion of the actuator (e.g. the portion no longer connected by the broken actuator shaft).

The system 1902 can include one or more joints 1922 that mount a control surface 1904 to a support structure of an aircraft 100. At least one of the joints 1922 includes a fixed frame 1920 for mounting to the aircraft and a control surface frame 1924 to which the control surface 1904 mounts. The control surface frame 1924 is rotatably connected to the fixed frame 1920, such as by one or more shafts such that the control surface 1904 can rotate relative to the fixed frame 1920.

The system 1902 includes at least one actuator 1906, which includes a shaft 1918 and a connecting portion 1916 that operatively connects the shaft 1918 of the actuator 1906 to the control surface frame 1924 such that the actuator 1906 can rotate the control surface frame 1924, and thus, the control surface 1904, relative to the fixed frame 1920. The actuator 1906 can therefore control an angular position of the control surface 1904 during normal operation, for instance, to control drag, lift, or another aerodynamic characteristic of an aircraft such as aircraft 100. The actuator can be a rotary actuator, for example, a rack and pinion actuator or a vane actuator.

The connecting portion 1916 is configured to rotatably couple the shaft 1918 and the control surface frame 1924 while being able to translate relative to the control surface frame 1924 in the event the shaft 1918 breaks. To this end, the connection portion 1916 can include one or more splines 1917 that form a splined engagement with the control surface frame 1924. The connecting portion 1916 can include a conical connecting component 1960 that can couple to a mating conical feature 1962 of the control surface frame 1924. For example, the conical connecting component 1960 can be a bevel gear and the conical feature 1962 can be an internal bevel gear. The conical engagement between the conical connecting component 1960 and the conical feature 1962 enable precise rotational coupling between the connecting portion 1916 (and, thus, the shaft 1918) and the control surface frame 1924, allowing for a relatively loose fitting splined engagement with the control surface frame 1924.

The system 1902 also includes a latch 1912 for preventing rotation of the control surface frame 1924 in the event that the actuator shaft driving tilting of the control surface breaks such that the control surface 1904 and control surface frame 1924 become disconnected from the separated portion of the actuator. The latch 1912 may include a first portion 1952 connected to the connecting portion 1916 of the actuator such that the connecting portion of the actuator remains connected to the first portion 1952 of the latch 1912 in the event that the actuator shaft 1918 breaks. The first portion 1952 of the latch 1912 may also be connected to a biasing member 1910 (e.g., a compression spring), for instance by rod end fitting 1930, that biases the latch 1912 toward the latched arrangement. As such, if the connecting portion 1916 of the actuator 1906 becomes disconnected from the rest of the actuator 1906, the biasing member 1910 forces the first portion of the latch 1912 into a second portion 1950 of the latch 1912, thus preventing rotation of the first portion of the joint in at least one direction.

In some embodiments, the first portion 1952 of the latch 1912 may be a conical lock and the second portion 1950 of the latch 1912 may be a mating conical locking cavity. The first portion 1952 of the latch 1912 may engage with the second portion 1950 of the latch 1912 preventing rotation in one or both directions when in the latched position. For instance, a friction-fit between the first and second latch portion may prevent rotation in both directions, whereas a ratchet configuration may allow for rotation in one direction. Alternatively, the first portion 1952 of the latch 1912 may be a bevel gear and the second portion 1950 of the latch 1912 may be an internal bevel gear. It should be understood that various other latch configurations can be implemented here without deviating from the scope of the claims, and that a friction-fit or ratchet latch configuration are only meant to be illustrative.

In normal operation, the first portion 1952 of the latch 1912 is not in contact with the second portion 1950 of the latch 1912. As such, in normal operation, the connecting portion 1916 can rotate relative to the fixed frame 1920 when the shaft 1918 of actuator 1906 rotates.

Figure 22:
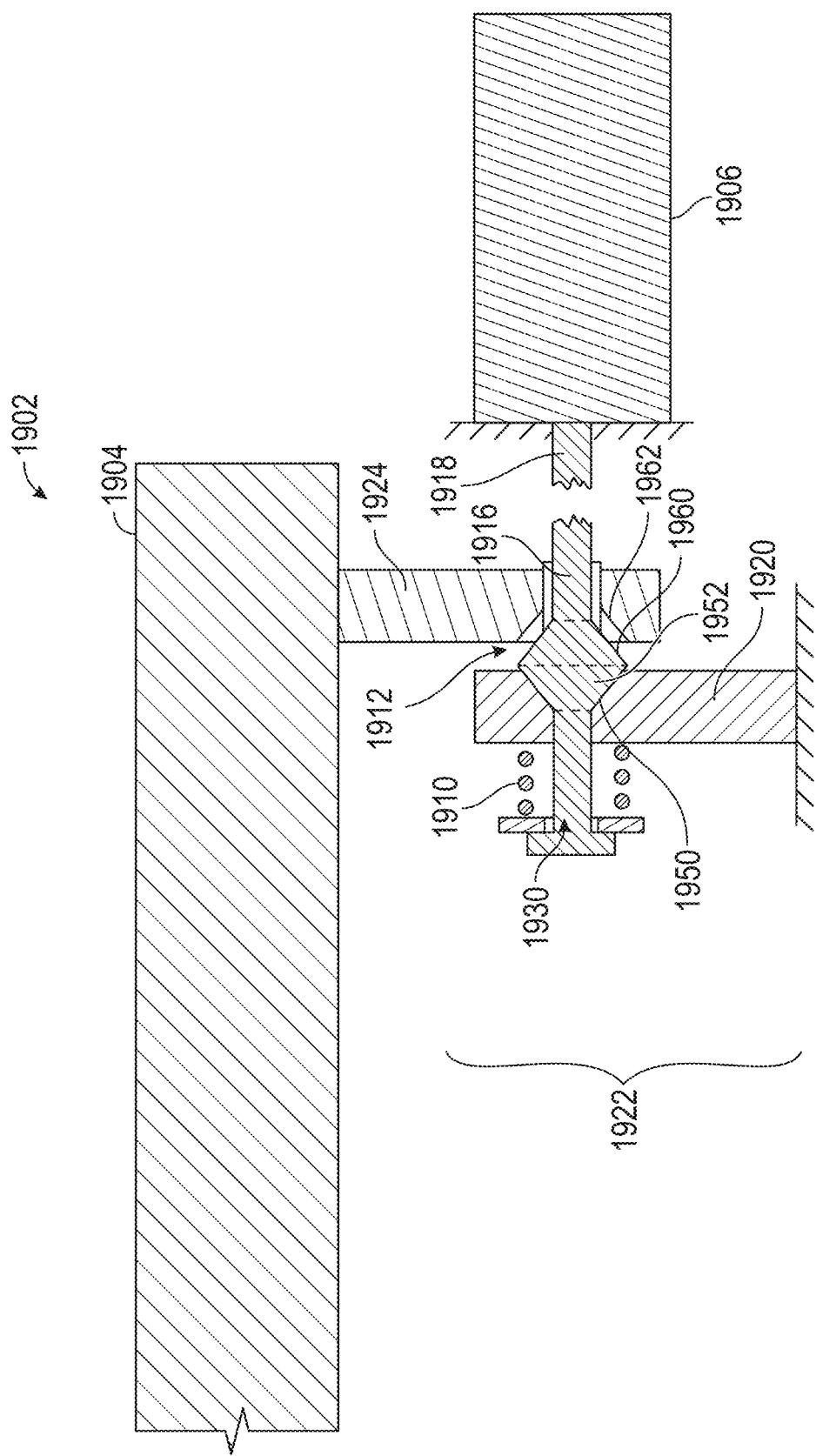
FIG. 22 shows a top view of the exemplary system of FIG. 21 in a second configuration, according to one or more examples of the disclosure.

As described above, in the event that the shaft 1918 of the actuator 1906 breaks (see exemplary fracture location in FIG. 22) such that the connecting portion 1916 of the actuator is disconnected from the rest of the actuator and/or the actuator is otherwise disconnected from the control surface, the first portion 1952 of the latch 1912 is propelled into the second portion 1950 of the latch 1912 by biasing member 1910, as shown in the configuration of system 1902 shown in FIG. 22. As such, the first portion 1952 of the latch 1912 is held in tension such that if the connecting portion 1916 of the actuator 1906 becomes separated from the rest of the actuator 1906, the connecting portion 1916 moves away from the rest of the actuator 1906 while remaining connected to the control surface frame 1924 in order to prevent rotation of control surface frame 1924 and the control surface 1904.

Whereas FIG. 21 shows the first portion 1952 of the latch 1912 disengaged from the second portion 1950 of the latch 1912, FIG. 22 illustrates the first portion 1952 of the latch 1912 engaged with the second portion 1950 of the latch 1912. In the latched position, rotational movement of the first portion 1952 of the latch 1912 is prevented in either or both directions by the second portion 1950 of the latch 1912. The connecting portion 1916 remains coupled to the control surface frame 1924, such as due to a splined engagement that permits the connecting portion 1916 and first portion 1952 of the latch 1912 to translate away from the actuator 1906. As such, the control surface frame 1924 is prevented from rotating in either or both directions due to the engagement between the first and second portions 1952, 1950 of the latch 1912. In the illustrated embodiment, the connecting component 1960 moves out of engagement with the conical feature 1962, but the splines 1917 remain in engagement with the control surface frame 1924 such that the connecting portion 1916 remains coupled to the control surface frame 1924. By stopping further rotation in one or both directions, the system 1902 prevents the catastrophic failure that may result from uncontrolled flutter/rotation of the control surface 1904 should the connecting portion 1916 actuator 1906 become disconnected (e.g., via a break in the actuator shaft) without requiring redundant actuators or damping mechanisms.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A joint assembly for an aircraft comprising:
a joint comprising a first portion rotatably coupled to a second portion so that the first portion can rotate relative to the second portion;
an actuator for rotating the first portion of the joint and comprising a connecting portion that connects to the first portion of the joint;
a proprotor coupled to the first portion of the joint, wherein the actuator tilts the proprotor between a vertical thrust orientation and a forward flight orientation; and
a latch moveable to a latched arrangement in which the latch prevents rotation of the first portion of the joint in at least one rotational direction, the latch being biased toward the latched arrangement and operatively connected to the connecting portion such that if the connecting portion becomes separated from the rest of the actuator, the latch moves to the latched arrangement, thereby preventing rotation of the first portion of the joint in the at least one rotational direction.

2. The assembly of claim 1, wherein the latch comprises a first portion that is coupled to the connecting portion of the actuator and a second portion that is in fixed arrangement with the second portion of the joint, the first portion being spaced from the second portion when the latch is in an unlatched arrangement and engaged with the second portion when the latch is in the latched arrangement.

3. The assembly of claim 2, wherein the first portion of the latch is integral to the connecting portion of the actuator.

4. The assembly of claim 3, wherein the connecting portion of the actuator comprises an output shaft of the actuator and the first portion of the latch projects from the output shaft.

5. The assembly of claim 2, wherein the connecting portion of the actuator comprises an output shaft that has a rotational axis that extends in a direction of bias of the first portion of the latch toward the second portion of the latch.

6. The assembly of claim 2, wherein the second portion of the latch is formed in the second portion of the joint.

7. The assembly of claim 1, wherein the latch comprises a ratchet that when in the latched arrangement prevents rotation of the first portion of the joint in a first rotational direction and permits rotation of the first portion of the joint in a second rotational direction.

8. The assembly of claim 7, wherein the first portion of the joint is configured for mounting the proprotor and, when the proprotor is mounted to the first portion of the joint, the proprotor is tiltable in the first rotational direction from the vertical thrust position to the forward thrust position.

9. The assembly of claim 1, wherein the latch is configured to prevent rotation of the first portion of the joint in both rotational directions when in the latched arrangement.

10. The assembly of claim 1, wherein the latch comprises a pawl that is rotatably mounted to the first portion of the joint.

11. The assembly of claim 10, wherein the pawl is connected to the connecting portion such that movement of the connecting portion causes rotation of the pawl relative to the first portion of the joint.

12. The assembly of claim 11, comprising a bracket that mounts to the connecting portion of the actuator and at least one link that connects the pawl to the bracket.

13. The assembly of claim 12, wherein a spring is connected to the bracket and biases the bracket, thereby biasing the pawl toward the latched arrangement.

14. The assembly of claim 1, wherein the connecting portion of the actuator is rotatably connected to the first portion of the joint.

15. The assembly of claim 1, wherein the connecting portion of the actuator is splined to the first portion of the joint and is held in tension such that if the connecting portion becomes separated from the rest of the actuator, the connecting portion moves away from the rest of the actuator while remaining splined to the first portion of the joint.

16. An aircraft comprising the joint assembly of claim 1.

17. A joint assembly for an aircraft comprising:
  a joint comprising a first portion rotatably coupled to a second portion so that the first portion can rotate relative to the second portion;
  an actuator for rotating the first portion of the joint and comprising a connecting portion that connects to the first portion of the joint;
  a flight control surface mounted to the first portion of the joint; and
  a latch moveable to a latched arrangement in which the latch prevents rotation of the first portion of the joint in at least one rotational direction, the latch being biased toward the latched arrangement and operatively connected to the connecting portion such that if the connecting portion becomes separated from the rest of the actuator, the latch moves to the latched arrangement, thereby preventing rotation of the first portion of the joint in the at least one rotational direction.

18. The assembly of claim 17, wherein the latch comprises a first portion that is coupled to the connecting portion of the actuator and a second portion that is in fixed arrangement with the second portion of the joint, the first portion being spaced from the second portion when the latch is in an unlatched arrangement and engaged with the second portion when the latch is in the latched arrangement.

19. The assembly of claim 18, wherein the first portion of the latch is integral to the connecting portion of the actuator.

20. The assembly of claim 18, wherein the connecting portion of the actuator comprises an output shaft of the actuator and the first portion of the latch projects from the output shaft.

21. The assembly of claim 18, wherein the connecting portion of the actuator comprises an output shaft that has a rotational axis that extends in a direction of bias of the first portion of the latch toward the second portion of the latch.

22. The assembly of claim 18, wherein the second portion of the latch is formed in the second portion of the joint.

23. The assembly of claim 17, wherein the latch comprises a ratchet that when in the latched arrangement prevents rotation of the first portion of the joint in a first rotational direction and permits rotation of the first portion of the joint in a second rotational direction.

24. The assembly of claim 17, wherein the latch is configured to prevent rotation of the first portion of the joint in both rotational directions when in the latched arrangement.

25. The assembly of claim 17, wherein the latch comprises a pawl that is rotatably mounted to the first portion of the joint.

26. The assembly of claim 25, wherein the pawl is connected to the connecting portion such that movement of the connecting portion causes rotation of the pawl relative to the first portion of the joint.

27. The assembly of claim 26, comprising a bracket that mounts to the connecting portion of the actuator and at least one link that connects the pawl to the bracket.

28. The assembly of claim 27, wherein a spring is connected to the bracket and biases the bracket, thereby biasing the pawl toward the latched arrangement.

29. The assembly of claim 17, wherein the connecting portion of the actuator is rotatably connected to the first portion of the joint.

30. The assembly of claim 17, wherein the connecting portion of the actuator is splined to the first portion of the joint and is held in tension such that if the connecting portion becomes separated from the rest of the actuator, the connecting portion moves away from the rest of the actuator while remaining splined to the first portion of the joint.

31. An aircraft comprising the joint assembly of claim 17.

32. A method for operating a joint assembly of an aircraft, comprising:
  rotating, by an actuator, a first portion of a joint relative to a second portion of the joint, wherein the actuator comprises a connecting portion that connects to the first portion of the joint;
  tilting, by the actuator, a proprotor between a vertical thrust orientation and a forward flight orientation; and
  preventing, by a latch moveable to a latched arrangement, rotation of the first portion of the joint in at least one rotational direction, the latch being biased toward the latched arrangement and operatively connected to the connecting portion such that if the connecting portion becomes separated from the rest of the actuator, the latch moves to the latched arrangement, thereby preventing rotation of the first portion of the joint in the at least one rotational direction.

33. The method of claim 32, further comprising at least one of:
  preventing, by the latch, rotation of the first portion of the joint relative to the second portion of the joint in a first direction and permitting rotation of the first portion of the joint relative to the second portion of the joint in a second direction when latched, or
  preventing, by the latch, rotation of the first portion of the joint relative to the second portion of the joint in both directions when latched.

34. A method for operating a joint assembly of an aircraft, comprising:
  rotating, by an actuator, a first portion of a joint relative to a second portion of the joint, wherein the actuator comprises a connecting portion that connects to the first portion of the joint;
  tilting, by the actuator, a flight control surface mounted to the first portion of the joint; and
  preventing, by a latch moveable to a latched arrangement, rotation of the first portion of the joint in at least one rotational direction, the latch being biased toward the latched arrangement and operatively connected to the connecting portion such that if the connecting portion becomes separated from the rest of the actuator, the latch moves to the latched arrangement, thereby preventing rotation of the first portion of the joint in the at least one rotational direction.

35. The method of claim 34, further comprising at least one of:
  preventing, by the latch, rotation of the first portion of the joint relative to the second portion of the joint in a first direction and permitting rotation of the first portion of the joint relative to the second portion of the joint in a second direction when latched, or preventing, by the latch, rotation of the first portion of the joint relative to the second portion of the joint in both directions when latched.

\* \* \* \* \*